United States Patent
Nakatani et al.

(10) Patent No.: US 6,820,418 B2
(45) Date of Patent: Nov. 23, 2004

(54) EXHAUST GAS PURIFICATION APPARATUS

(75) Inventors: Koichiro Nakatani, Susono (JP); Toshiaki Tanaka, Numazu (JP); Shinya Hirota, Susono (JP); Kazuhiro Itoh, Mishima (JP); Takamitsu Asanuma, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/311,016

(22) PCT Filed: Feb. 20, 2002

(86) PCT No.: PCT/JP02/01499
§ 371 (c)(1),
(2), (4) Date: Dec. 12, 2002

(87) PCT Pub. No.: WO02/090731
PCT Pub. Date: Nov. 14, 2002

(65) Prior Publication Data
US 2003/0172642 A1 Sep. 18, 2003

(30) Foreign Application Priority Data
Apr. 26, 2001 (JP) ........................................ 2001-130109

(51) Int. Cl.$^7$ ................................................ F01N 3/00
(52) U.S. Cl. .............................. 60/297; 60/285; 60/311; 55/DIG. 30
(58) Field of Search .......................... 60/274, 276, 277, 60/285, 286, 297, 311; 55/DIG. 30

(56) References Cited

U.S. PATENT DOCUMENTS

| | | | | |
|---|---|---|---|---|
| 4,404,795 A | * | 9/1983 | Oishi et al. .................... | 60/274 |
| 4,934,142 A | * | 6/1990 | Hayashi et al. ................ | 60/297 |
| 5,100,632 A | | 3/1992 | Dettling et al. | |
| 5,218,817 A | * | 6/1993 | Urata ........................... | 60/274 |
| 5,253,476 A | * | 10/1993 | Levendis et al. .............. | 60/311 |
| 5,725,618 A | * | 3/1998 | Shimoda et al. ............... | 60/311 |
| 5,853,438 A | * | 12/1998 | Igarashi ........................ | 60/311 |
| 6,090,187 A | * | 7/2000 | Kumagai ...................... | 60/311 |
| 6,233,926 B1 | * | 5/2001 | Bailey et al. .................. | 60/297 |
| 6,644,022 B2 | * | 11/2003 | Hirota et al. .................. | 60/297 |

FOREIGN PATENT DOCUMENTS

| | | |
|---|---|---|
| JP | A 6-159037 | 6/1994 |
| JP | B2 7-106290 | 11/1995 |
| JP | A 11-200847 | 7/1999 |
| JP | A 2000-120433 | 4/2000 |
| JP | A 2000-303878 | 10/2000 |

* cited by examiner

Primary Examiner—Tu M. Nguyen
(74) Attorney, Agent, or Firm—Oliff & Berridge, PLC

(57) ABSTRACT

A particulate filter (22) is arranged in an exhaust passage of an internal combustion engine. Whether the particulate deposited on the particulate filter (22) has changed in property to a property harder to oxidize compared with right after deposition is predicted or judged. When the fact that the particulate deposited on the particulate filter (22) has changed in property to a property harder to oxidize compared with right after deposition is predicted or judged, the air-fuel ratio of the exhaust gas flowing into the particulate filter (22) is switched temporarily from lean to rich.

16 Claims, 28 Drawing Sheets

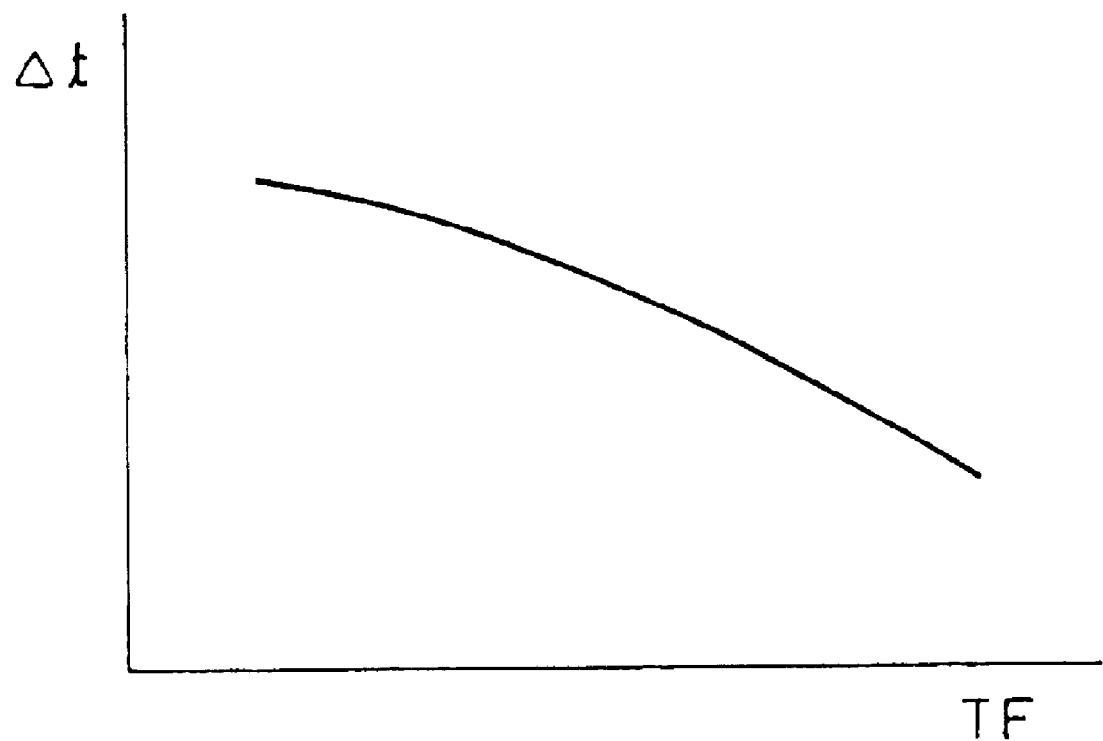

EXHAUST GAS PURIFICATION APPARATUS

TECHNICAL FIELD

The present invention relates to an exhaust gas purification apparatus.

BACKGROUND ART

In the past, in a diesel engine, particulate contained in the exhaust gas has been removed by arranging a particulate filter in the engine exhaust passage, using that particulate filter to trap the particulate in the exhaust gas once, and igniting and burning the particulate trapped on the particulate filter to regenerate the particulate filter. In this case, making the trapped particulate ignite and burn requires a considerably high temperature and a considerable time.

On the other hand, there is known an internal combustion engine carrying on the particulate filter an $NO_x$ absorbent which absorbs $NO_x$ when the air-fuel ratio is lean and releases the absorbed $NO_x$ when the air-fuel ratio is made rich (see Japanese Unexamined Patent Publication (Kokai) No. 6-159037). In this internal combustion engine, the engine is usually operated under a lean air-fuel ratio. When the amount of $NO_x$ absorbed in the $NO_x$ absorbent exceeds an allowable value, the air-fuel ratio is temporarily made rich to cause the $NO_x$ to be released from the $NO_x$ absorbent.

When $NO_x$ is released from the $NO_x$ absorbent and reduced, the heat occurring at the time of reduction of the $NO_x$ causes the temperature of the particulate filter to rise. Therefore, in one example of this internal combustion engine, when the $NO_x$ finishes being released, the air-fuel ratio is returned to the lean state once again. Using the fact that the temperature of the particulate filter is rising at that time, the particulate deposited on the particulate filter is made to burn. Further, in another example, when $NO_x$ should be released from the $NO_x$ absorbent, when the exhaust pressure upstream of the particulate filter does not exceed a predetermined pressure, the air-fuel ratio is just made rich, while when the exhaust pressure upstream of the particulate filter exceeds the predetermined pressure, the air-fuel ratio is made rich to cause the $NO_x$ to be released from the $NO_x$ absorbent, then the air-fuel ratio is made lean to cause the particulate deposited on the particulate filter to burn.

As explained above, however, causing the particulate trapped on the particulate filter to ignite and burn requires a considerably high temperature and a considerable time. In this case, getting the temperature of the particulate filter to rise to the temperature where the deposited particulate will ignite and burn requires that energy be supplied from the outside. Therefore, usually, additional fuel is fed or an electric heater is used to cause the temperature of the particulate filter to rise. Therefore, if burning of the particulate takes time, that much more excess energy will become required. Reduction of this excess consumption of energy requires that the time needed for burning the particulate be shortened as much as possible.

Inventors researched the properties of the deposited particulate from this viewpoint and as a result the properties of the deposited particulate gradually became clear. The details will be explained later, but briefly, it was found that the longer the time of deposition of the particulate on the particulate filter, the harder the deposited particulate will be to oxidize and as a result ignition and burning of the deposited particulate required a considerably high temperature and considerable time. That is, it was found that if it were possible to change the particulate in property to a property of easy oxidation when the deposited particulate becomes hard to oxidize, the time required for burning the particulate can be shortened.

Therefore, the inventors proceeded with further research on this point and as a result found that by temporarily making the air-fuel ratio rich, the deposited particulate could be changed in property to a property of easy oxidation. That is, it was found that if making the air-fuel ratio temporarily rich when the deposited particulate becomes hard to oxidize, the particulate becomes easy to oxidize and therefore the time required for burning the particulate can be shortened.

In the above-mentioned known internal combustion engine, $NO_x$ is released from the $NO_x$ absorbent by occasionally temporarily making the air-fuel ratio rich. Therefore, the pattern of change of the air-fuel ratio resembles that of the present invention. In this known internal combustion engine, however, the air-fuel ratio is temporarily made rich when the amount of $NO_x$ absorption of the $NO_x$ absorbent exceeds an allowable amount, while in the present invention, the air-fuel ratio is made temporarily rich when the deposited particulate becomes hard to oxidize. Not only are the objects of making the air-fuel ratios rich different, but also the timings of making them rich differ. That is, even if making the air-fuel ratio rich at the timing of releasing $NO_x$ from the $NO_x$ absorbent, it is not necessarily possible to continue to change the deposited particulate to an easily oxidizing state.

DISCLOSURE OF THE INVENTION

An object of the present invention is to provide an exhaust gas purification apparatus enabling particulate deposited on a particulate filter to be made to burn in a short time.

According to a first aspect of the present invention, there is provided an exhaust gas purification apparatus of an internal combustion engine in which a particulate filter for trapping and removing particulate in an exhaust gas is arranged in an engine exhaust passage and in which burning is continued under a lean air-fuel ratio, the apparatus comprising predicting means for predicting if the particulate deposited on the particulate filter has changed in property to a property harder to oxidize compared with right after deposition, air-fuel ratio switching means for temporarily switching the air-fuel ratio of exhaust gas flowing into the particulate filter from lean to rich to cause the particulate deposited on the particulate filter to change in property to a property of easy oxidation when it is predicted that the particulate deposited on the particulate filter has changed in property to a property harder to oxidize compared with right after deposition, judging means for judging if the amount of particulate deposited on the particulate filter has exceeded a predetermined amount, and temperature control means for causing the temperature of the particulate filter to rise under a lean air-fuel ratio so as to remove by oxidation the particulate deposited on the particulate filter when the amount of the particulate deposited on the particulate filter has exceeded a predetermined amount.

According to a second aspect of the present invention, there is provided an exhaust gas purification apparatus of an internal combustion engine in which a particulate filter for trapping and removing particulate in an exhaust gas is arranged in an engine exhaust passage and in which burning is continued under a lean air-fuel ratio, the apparatus comprising first judging means for judging if the particulate deposited on the particulate filter has changed in property to a property harder to oxidize compared with right after deposition, air-fuel ratio switching means for temporarily switching the air-fuel ratio of exhaust gas flowing into the particulate filter from lean to rich to cause the particulate deposited on the particulate filter to change in property to a property of easy oxidation when it is judged that the particulate deposited on the particulate filter has changed in property to a property harder to oxidize compared with right after deposition, second judging means for judging if the amount of particulate deposited on the particulate filter has exceeded a predetermined amount, and temperature control means for causing the temperature of the particulate filter to rise under a lean air-fuel ratio so as to remove by oxidation the particulate deposited on the particulate filter when the amount of the particulate deposited on the particulate filter has exceeded a predetermined amount.

According to a third aspect of the present invention, there is provided an exhaust gas purification apparatus of an internal combustion engine in which a particulate filter for trapping and removing particulate in an exhaust gas is arranged in an engine exhaust passage and in which burning is continued under a lean air-fuel ratio, the apparatus comprising air-fuel ratio switching means able to temporarily switch the air-fuel ratio of exhaust gas flowing into the particulate filter from lean to rich, judging means for judging if the amount of particulate deposited on the particulate filter has exceeded a predetermined amount, and temperature control means for causing the temperature of the particulate filter to rise under a lean air-fuel ratio so as to remove by oxidation the particulate deposited on the particulate filter after temporarily switching the air-fuel ratio of the exhaust gas flowing into the particulate filter from lean to rich to make the particulate deposited on the particulate filter change in property to a property of easy oxidation when the amount of the particulate deposited on the particulate filter has exceeded a predetermined amount.

BRIEF DESCRIPTION OF THE DRAWINGS

FIG. 13 is a view of a time Δt;

BEST MODE FOR CARRYING OUT THE INVENTION

Figure 1:
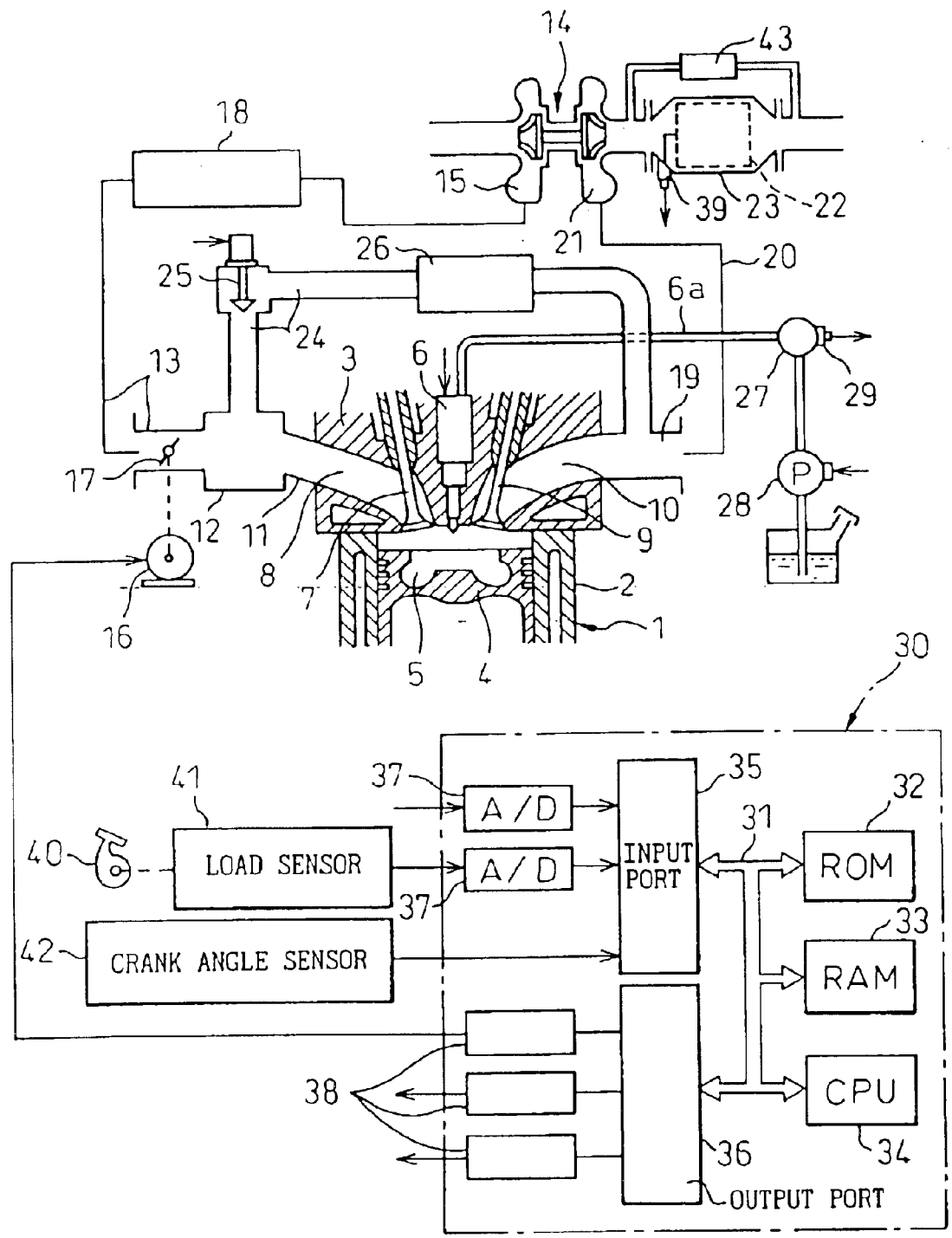
FIG. 1 is an overall view of an internal combustion engine.

FIG. 1 shows the case of application of the present invention to a compression ignition type internal combustion engine. Note that the present invention can also be applied to a spark ignition type internal combustion engine.

Referring to FIG. 1, 1 indicates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected to a surge tank 12 through a corresponding intake tube 11, while the surge tank 12 is connected to a compressor 15 of an exhaust turbocharger 14 through an intake duct 13. Inside the intake duct 13 is arranged a throttle valve 17 driven by a step motor 16. Further, a cooling device 18 is arranged around the intake duct 13 for cooling the intake air flowing through the intake duct 13. In the embodiment shown in FIG. 1, the engine coolant water is led inside the cooling device 18 and the intake air is cooled by the engine coolant water. On the other hand, the exhaust port 10 is connected to an exhaust turbine 21 of an exhaust turbocharger 14 through an exhaust manifold 19 and an exhaust pipe 20. The outlet of the exhaust turbine 21 is connected to a filter casing 23 housing a particulate filter 22.

The exhaust manifold 19 and the surge tank 12 are connected to each other through an exhaust gas recirculation (EGR) passage 24. Inside the EGR passage 24 is arranged an electrically controlled EGR control valve 25. A cooling device 26 is arranged around the EGR passage 24 to cool the EGR gas circulating inside the EGR passage 24. In the embodiment shown in FIG. 1, the engine coolant water is guided inside the cooling device 26 and the EGR gas is cooled by the engine coolant water. On the other hand, fuel injectors 6 are connected to a fuel reservoir, a so-called common rail 27, through fuel feed pipes 6a. Fuel is fed into the common rail 27 from an electrically controlled variable discharge fuel pump 28. The fuel fed into the common rail 27 is fed to the fuel injectors 6 through the fuel feed pipes 6a. The common rail 27 has a fuel pressure sensor 29 attached to it for detecting the fuel pressure in the common rail 27. The discharge of the fuel pump 28 is controlled based on the output signal of the fuel pressure sensor 29 so that the fuel pressure in the common rail 27 becomes a target fuel pressure.

An electronic control unit 30 is comprised of a digital computer provided with a ROM (read only memory) 32, RAM (random access memory) 33, CPU (microprocessor) 34, input port 35, and output port 36 connected to each other through a bidirectional bus 31. The output signal of the fuel pressure sensor 29 is input through a corresponding AD converter 37 to the input port 35. Further, the particulate filter 22 has attached to it a temperature sensor 39 for detecting the temperature of the particulate filter 22. The output signal of this temperature sensor 39 is input to the input port 35 through the corresponding AD converter 37. Further, the particulate filter 22 has attached to it a pressure sensor 43 for detecting the pressure difference between the pressure of the exhaust gas upstream of the particulate filter 22 and the pressure of the exhaust gas downstream of it, that is, the pressure drop at the particulate filter 22. The output signal of the pressure sensor 43 is input through a corresponding AD converter 37 to the input port 35.

On the other hand, an accelerator pedal 40 has connected to it a load sensor 41 generating an output voltage proportional to the amount of depression L of the accelerator pedal 40. The output voltage of the load sensor 41 is input to the input port 35 through the corresponding AD converter 37. Further, the input port 35 has connected to it a crank angle sensor 42 generating an output pulse each time a crankshaft rotates by for example 30 degrees. On the other hand, the output port 36 is connected through a corresponding drive circuit 38 to the fuel injector 6, step motor 16 for driving the throttle valve, EGR control valve 25, and fuel pump 28.

Figure 2A:
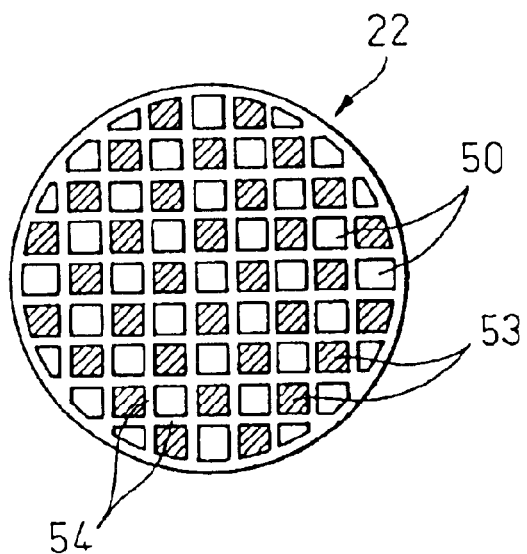
FIGS. 2A and 2B are views of a particulate filter.
Figure 2B:
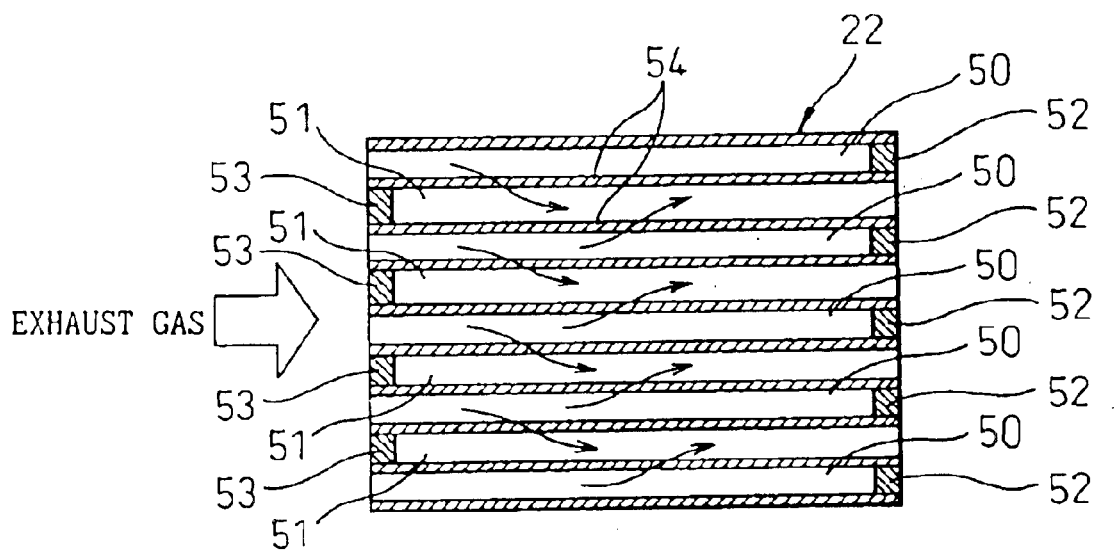

FIGS. 2A and 2B show the structure of the particulate filter 22. Note that FIG. 2A is a front view of the particulate filter 22, while FIG. 2B is a side sectional view of the particulate filter 22. As shown in FIGS. 2A and 2B, the particulate filter 22 forms a honeycomb structure and is provided with a plurality of exhaust flow passages 50, 51 extending in parallel with each other. These exhaust flow passages are comprised by exhaust gas inflow passages 50 with downstream ends sealed by plugs 52 and exhaust gas outflow passages 51 with upstream ends sealed by plugs 52. Note that the hatched portions in FIG. 2A show plugs 53. Therefore, the exhaust gas inflow passages 50 and the exhaust gas outflow passages 51 are arranged alternately through thin wall partitions 54. In other words, the exhaust gas inflow passages 50 and the exhaust gas outflow passages 51 are arranged so that each exhaust gas inflow passage 50 is surrounded by four exhaust gas outflow passages 51, and each exhaust gas outflow passage 51 is surrounded by four exhaust gas inflow passages 50.

The particulate filter 22 is formed from a porous material such as for example cordierite. Therefore, the exhaust gas flowing into the exhaust gas inflow passages 50 flows out into the adjoining exhaust gas outflow passages 51 through the surrounding partitions 54 as shown by the arrows in FIG. 2B.

In the first embodiment to fifth embodiment of the present invention, a layer of a carrier comprised of for example alumina is formed on the peripheral surfaces of the exhaust gas inflow passages 50 and the exhaust gas outflow passages 51, that is, the two side surfaces of the partitions 54 and the inside walls of the fine holes in the partitions 54. On the carrier are carried a precious metal catalyst such as platinum Pt or a rare earth catalyst such as cerium Ce. Note that the particulate filter 22 used in the present invention does not carry an $NO_x$ absorbent which absorbs $NO_x$ at a lean air-fuel ratio and releases $NO_x$ at a rich air-fuel ratio.

Particulate comprised of mainly solid carbon contained in the exhaust gas is trapped and deposits on the particulate filter 22. The particulate deposited on the particulate filter 22 is successively made to oxidize in a period of from 30 seconds to about 1 hour. Therefore, particulate is constantly depositing on the particulate filter 22. When the temperature of the particulate filter 22 is maintained at a temperature at which the particulate can be oxidized, for example, at least 250° C., when the amount of the particulate sent into the particulate filter 22 per unit time is not that great, the particulate can be oxidized at some time or another. Therefore, in this case, all of the particulate can be continuously oxidized.

On the other hand, when the amount of particulate sent into the particulate filter 22 per unit time becomes great or when the temperature of the particulate filter 22 becomes low, the amount of the particulate not sufficiently oxidized increases, so the amount of the particulate deposited on the particulate filter 22 increases. In the actual operating state, the amount of particulate sent into the particulate filter 22 per unit time sometimes becomes great and the temperature of the particulate filter 22 sometimes becomes low, so the amount of particulate deposited on the particulate filter 22 gradually increases.

Next, the extent of the ease of oxidation of particulate deposited on the particulate filter 22, that is, the particulate oxidation, will be explained with reference to FIGS. 3A and 3B. Note that in FIGS. 3A and 3B, A/F shows the air-fuel ratio of the exhaust gas flowing into the particulate filter 22. In the present application, the ratio between the air and the fuel fed into the intake passage, the combustion chamber 5 and the exhaust passage upstream of the particulate filter 22 will be called the "air-fuel ratio of the exhaust gas".

Figure 3A:
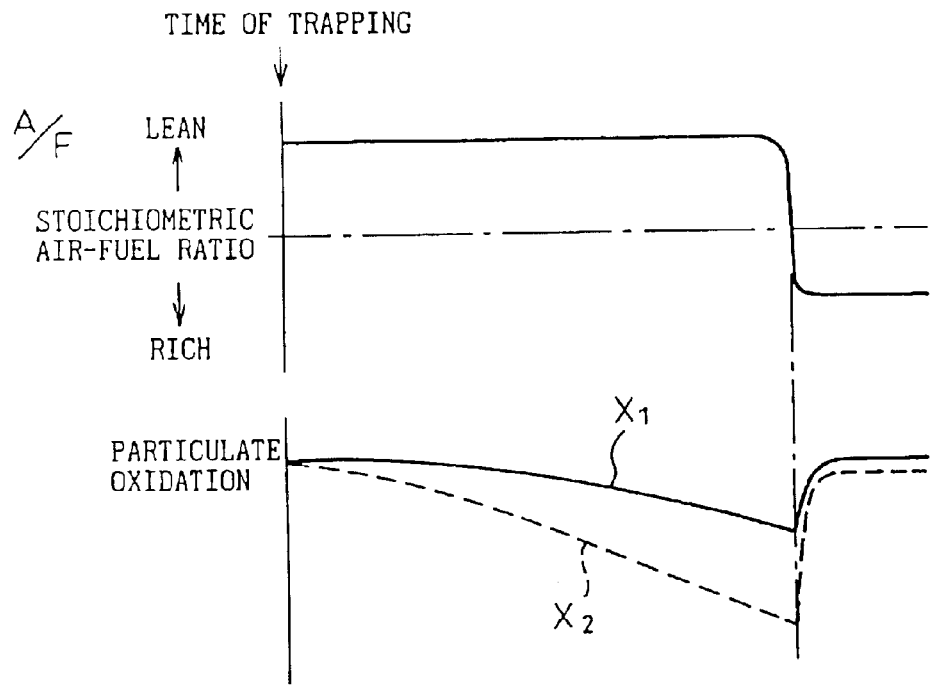
FIGS. 3A and 3B are views of a change of oxidation of particulate.

In FIG. 3A, the solid line $X_1$ shows the case when the temperature of the particulate filter 22 is relatively low, while the broken line $X_2$ shows the case where the temperature of the particulate filter 22 is high. If particulate deposits on the particulate filter 22, a large number of fine holes or voids will be formed inside the mass of the deposited particulate. Therefore, the ratio between the surface area S of the particulate inside the mass and the volume V of the mass of the particulate, that is, the surface area/volume ratio S/V, becomes a considerably large value. The surface area/volume ratio S/V being large means that the contact area between the particulate and oxygen is large and therefore shows that the oxidation of the particulate is good.

On the other hand, if the state of the air-fuel ratio A/F becoming lean continues after the particulate is trapped, the particulate aggregates and the dimensions of the particulate gradually become larger. As a result, the number of the fine holes or voids in the mass of the particulate gradually is reduced. Therefore, the surface area/volume ratio S/V of the mass of the particulate gradually falls and consequently the oxidation of the particulate gradually drops as shown by $X_1$ and $X_2$ in FIG. 3A. The aggregating action of the particulate becomes greater the higher the temperature. Therefore, as shown in FIG. 3A, the oxidation of the particulate falls earlier in the high temperature case shown by $X_2$ than the low temperature case shown by $X_1$. If this drop in the oxidation of the particulate is allowed to continue, the particulate will become extremely hard to oxidize and as a result a long time will be required for burning the deposited particulate.

However, it was found that if making the air-fuel ratio A/F rich as shown in FIG. 3A when the oxidation of the particulate drops in this way, the oxidation of the particulate is restored. The reasons are not clear, but it is believed that making the air-fuel ratio A/F rich is similar to the activating action at the time of producing coke. That is, if the air-fuel ratio A/F is made rich, the oxygen is extremely small, so the $CO_2$ or $H_2O$ in the exhaust gas cleave the carbon bonds and as a result a large number of fine holes or voids are again produced. In actuality, if trying to measure the surface area/volume ratio S/v of the mass of particulate after making the air-fuel ratio A/F rich, the surface area/volume ratio S/VC considerably increases.

Note that in this case as well, the attack by the $CO_2$ or $H_2O$ becomes more aggressive when the temperature of the particulate filter 22 is high. Therefore, the oxidation of the particulate becomes higher when the temperature of the particulate filter 22 shown by the broken line $Y_2$ in FIG. 3B is high compared with the case where the temperature of the particulate filter 22 shown by the solid line $Y_1$ is low.

If making the air-fuel ratio A/F rich in this way, the oxidation of the particulate becomes better. Therefore, when continuously burning the particulate under a lean air-fuel ratio, it becomes possible to maintain a state of easy oxidation of the particulate if occasionally making the air-fuel ratio A/F rich.

Figure 4:
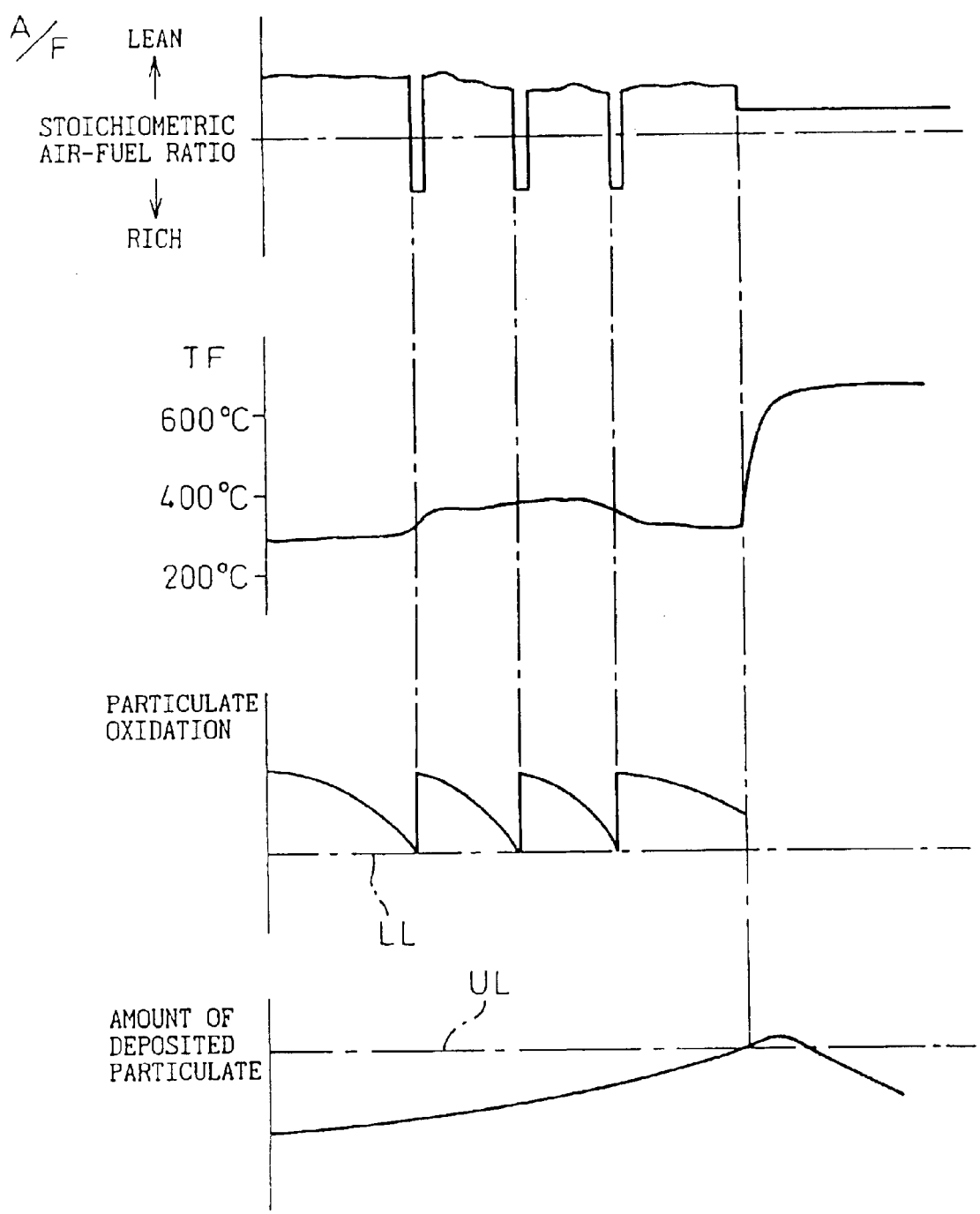
FIG. 4 is a view of an example of operational control.
Figure 5:
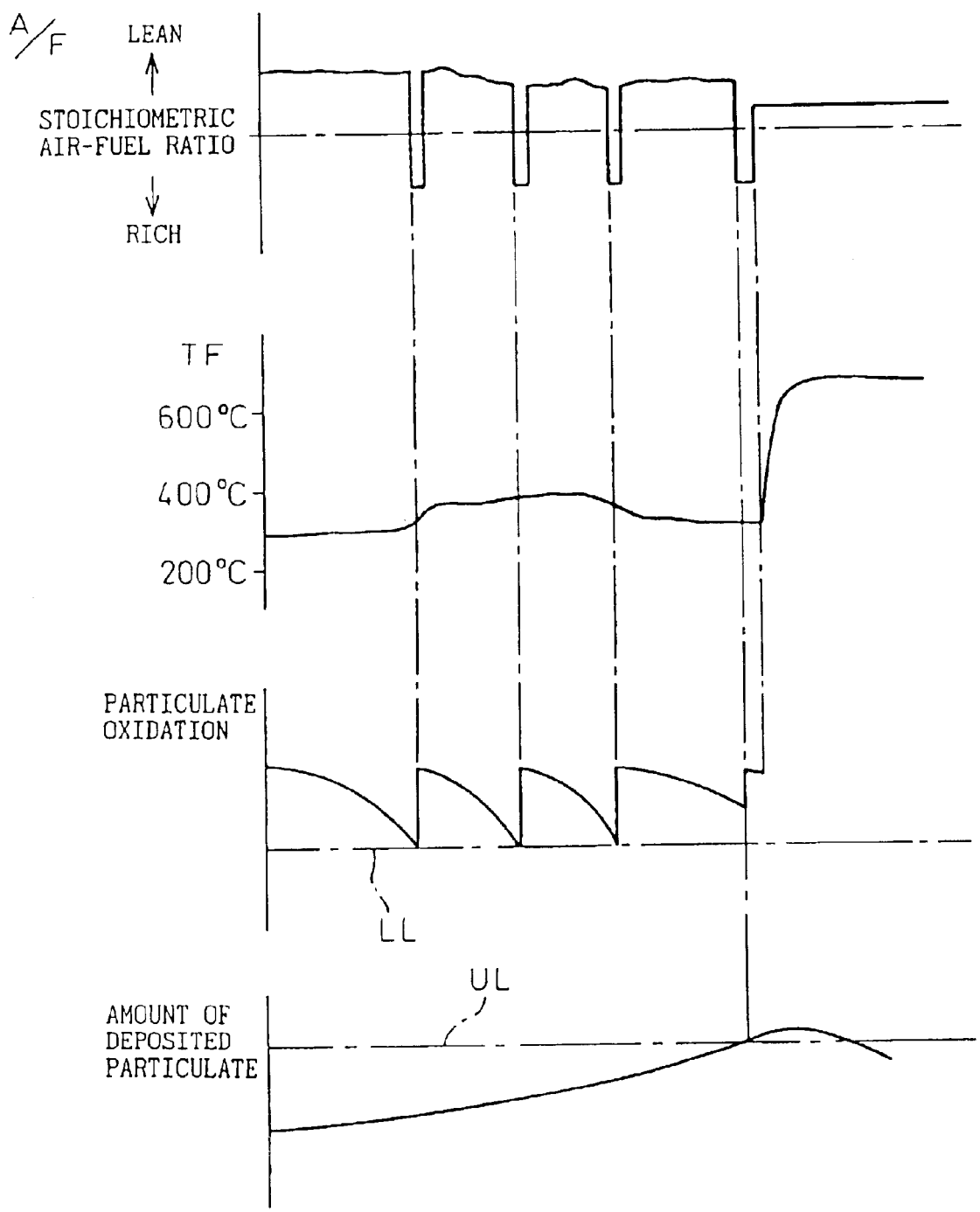
FIG. 5 is a view of another example of operational control.

FIG. 4 and FIG. 5 show the basic thinking in operational control according to the present invention. Note that in FIG. 4 and FIG. 5, TF shows the temperature of the particulate filter 22.

In the example shown in FIG. 4, when the oxidation of the particulate falls to the allowable limit LL, the air-fuel ratio A/F is temporarily switched to rich. Each time the air-fuel ratio is made rich, the oxidation of the particulate is raised. Next, if the amount of particulate deposited on the particulate filter 22 exceeds a predetermined amount UL, temperature raising control is performed to cause the temperature of the particulate filter 22 to rise to at least 600° C. and then maintain it at least at 600° C. while maintaining the state of the lean air-fuel ratio. When temperature raising control is performed, the particulate deposited on the particulate filter 22 is made to ignite and burn.

That is, in this embodiment of the present invention, provision is made of air-fuel ratio switching means for temporarily switching the air-fuel ratio A/F of exhaust gas flowing into the particulate filter 22 from lean to rich so as to make the particulate deposited on the particulate filter 22 change in property to a property of easy oxidation when the particulate deposited on the particulate filter 22 changes in property to a property harder to oxidize compared with right after deposition, judging means for judging if the amount of particulate deposited on the particulate filter 22 has exceeded a predetermined amount UL, and temperature control means for making the temperature of the particulate filter 22 rise under a lean air-fuel ratio so as to remove by oxidation the particulate deposited on the particulate filter 22 when the amount of particulate deposited on the particulate filter 22 exceeds the predetermined amount UL.

Note that there are various methods for temporarily switching the air-fuel ratio A/F from lean to rich. For example, there are the method of making the average air-fuel ratio in the combustion chamber 5 rich, the method of injecting additional fuel into the combustion chamber 5 after the expansion stroke or during the exhaust stroke, and the method of injecting additional fuel into the exhaust passage upstream of the particulate filter 22.

On the other hand, there are also various methods for making the temperature of the particulate filter 22 rise. For example, there are the method of arranging an electric heater at the upstream end of the particulate filter 22 and using the electric heater to heat the particulate filter 22 or the exhaust gas flowing into the particulate filter 22, the method of injecting fuel into the exhaust passage upstream of the particulate filter 22 and making that fuel burn to heat the particulate filter 22, and the method of making the temperature of the exhaust gas rise to make the temperature of the particulate filter 22 rise.

Here, the final method, that is, the method of making the temperature of the exhaust gas rise, will be explained in brief with reference to FIG. 6.

One method effective for making the temperature of the exhaust gas rise is the method of delaying the fuel injection timing to after top dead center of the compression stroke. That is, normally the main fuel $Q_m$ is injected near top dead center of the compression stroke as shown by (I) in FIG. 6. In this case, as shown by (II) in FIG. 6, if the injection timing of the main fuel $Q_m$ is retarded, the after burning period becomes longer and therefore the temperature of the exhaust gas rises. If the temperature of the exhaust gas becomes higher, the temperature TF of the particulate filter 22 rises along with that.

Figure 6:
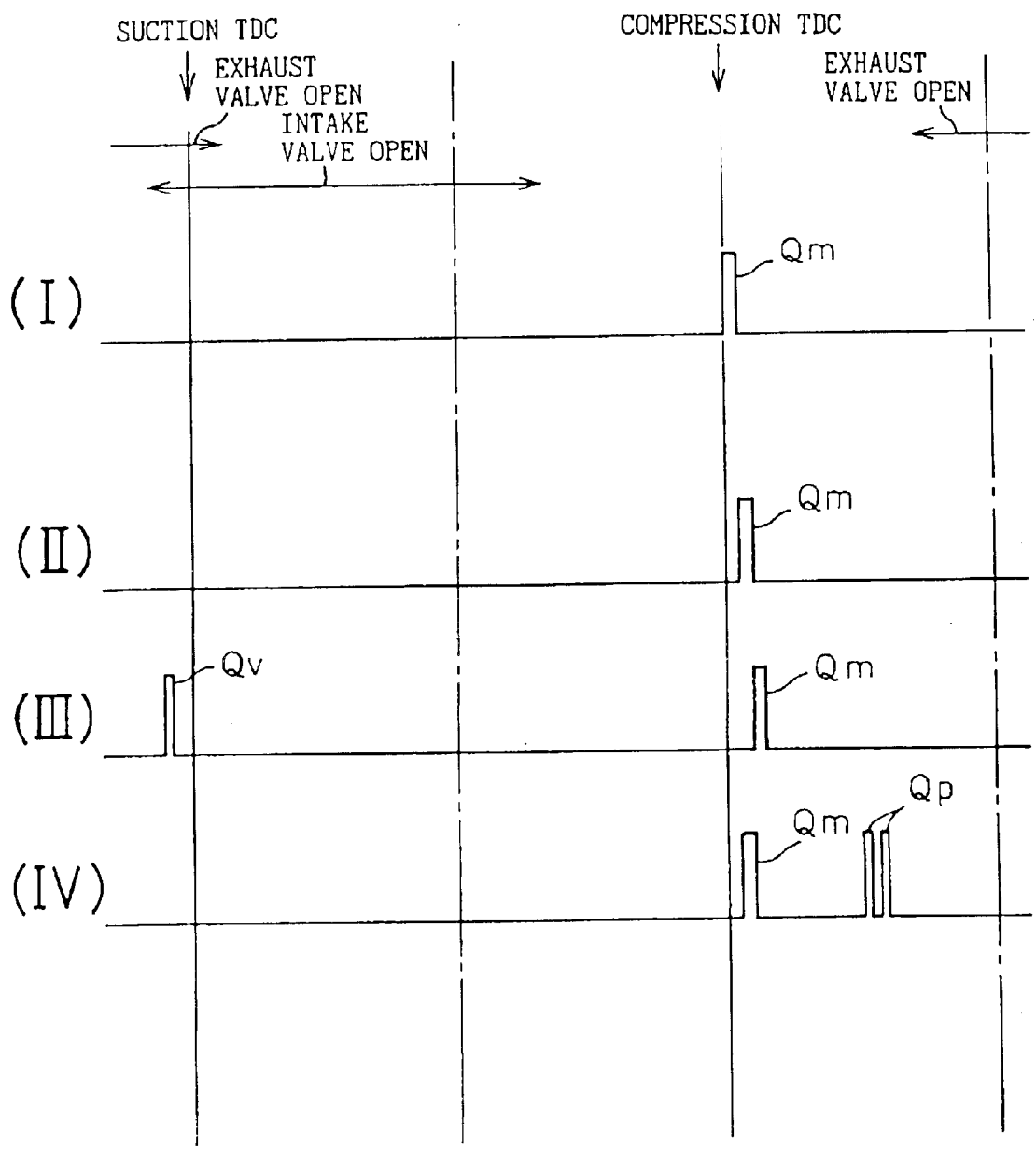
FIG. 6 is a view for explaining injection control.

Further, to make the temperature of the exhaust gas rise, as shown by (III) in FIG. 6, it is also possible to inject auxiliary fuel $Q_v$ near top dead center of the suction stroke in addition to the main fuel $Q_m$. If auxiliary fuel $Q_v$ is additionally injected in this way, the fuel which can be burned increases by exactly the amount of the auxiliary fuel $Q_v$, so the temperature of the exhaust gas rises and consequently the temperature TF of the particulate filter 22 rises.

On the other hand, if injecting auxiliary fuel $Q_v$ near top dead center of the suction stroke in this way, the heat of compression causes the production of aldehydes, ketones, peroxides, carbon monoxide, and other intermediate products during the compression stroke. These intermediate products cause the reaction of the main fuel $Q_m$ to be accelerated. Therefore, in this case, as shown by (III) in FIG. 6, even if greatly retarding the injection timing of the main fuel $Q_m$, good combustion will be obtained without causing misfires. That is, since it is possible to greatly retard the injection timing of the main fuel $Q_m$ in this way, the temperature of the exhaust gas becomes considerably high and therefore the temperature TF of the particulate filter 22 can be made to quickly rise.

Further, as shown by (IV) of FIG. 6, it is also possible to inject auxiliary fuel $Q_p$ during the expansion stroke or exhaust stroke in addition to the main fuel $Q_m$. That is, in this case, the major part of the auxiliary fuel $Q_p$ is not burned, but exhausted in the exhaust passage in the form of unburned HC. This unburned HC is oxidized by the excess oxygen on the particulate filter 22. The heat of oxidation reaction produced at that time causes the temperature of the particulate filter 22 to rise.

In FIG. 4, the temperature of the particulate filter 22 for burning the deposited particulate is made to rise using the method of (IV) of FIG. 6. Therefore, as shown in FIG. 4, when the temperature of the particulate filter 22 is to be raised as shown in FIG. 4, the air-fuel ratio A/F becomes just slightly smaller.

On the other hand, in the example shown in FIG. 5 as well, if the oxidation of the particulate drops to the allowable limit LL, the air-fuel ratio A/F is temporarily switched to rich. Each time the air-fuel ratio is made rich, the oxidation of the particulate is improved. However, in the example shown in FIG. 5, if the amount of particulate deposited on the particulate filter 22 exceeds the predetermined amount UL, the air-fuel ratio A/F is temporarily switched from lean to rich to raise the oxidation of the particulate. Next, temperature raising control is performed to make the temperature of the particulate filter 22 rise to at least 600° C. and then maintain it at least at 600° C. while continuing the state of the lean air-fuel ratio. In this way, in the example shown in FIG. 5, since the deposited particulate starts to be burned in the state with the oxidation of the deposited particulate raised, the time for burning the deposited particulate is further shortened.

As operational control, it is possible to use any of the method shown in FIG. 4 and the method shown in FIG. 5. In the embodiments explained below, however, the explanation is given taking as an example the case of use of the method shown in FIG. 5. Next, the embodiments will be successively explained.

Figure 7:
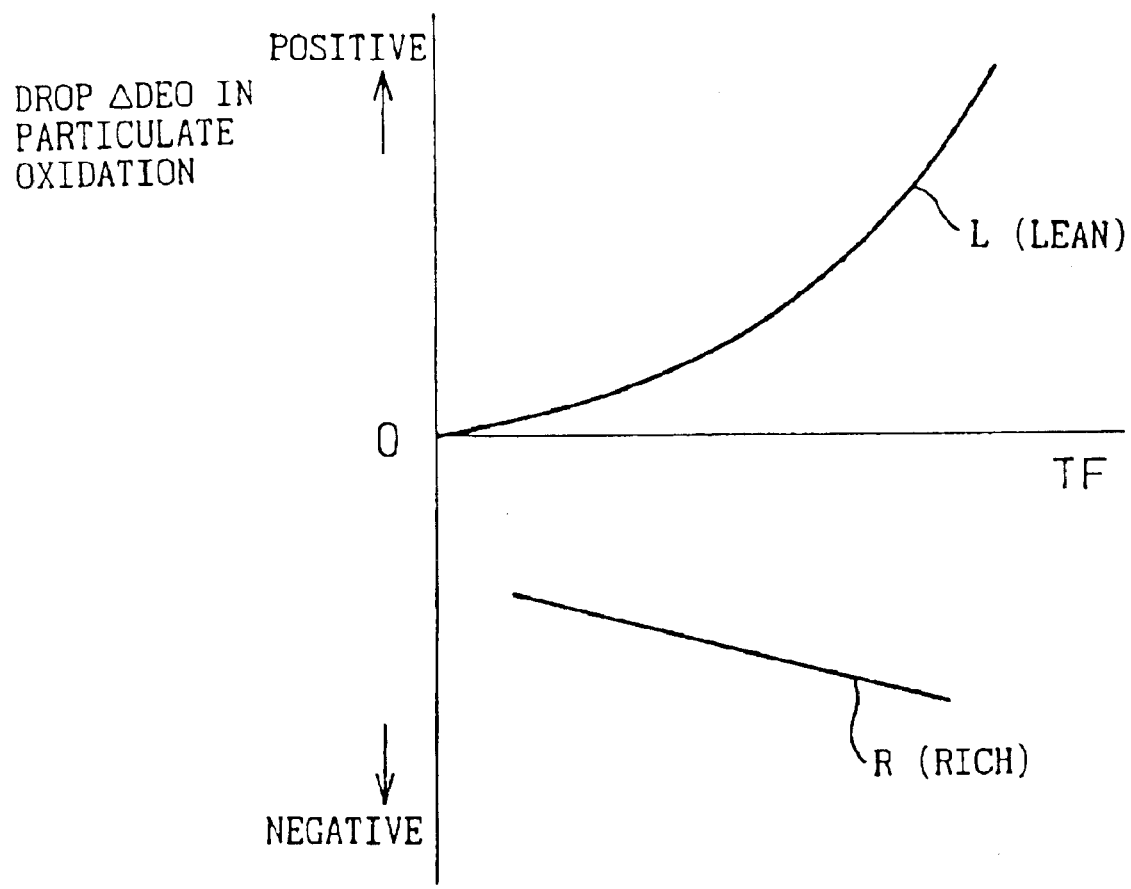
FIG. 7 is a view of a drop in particulate oxidation.
Figure 8:
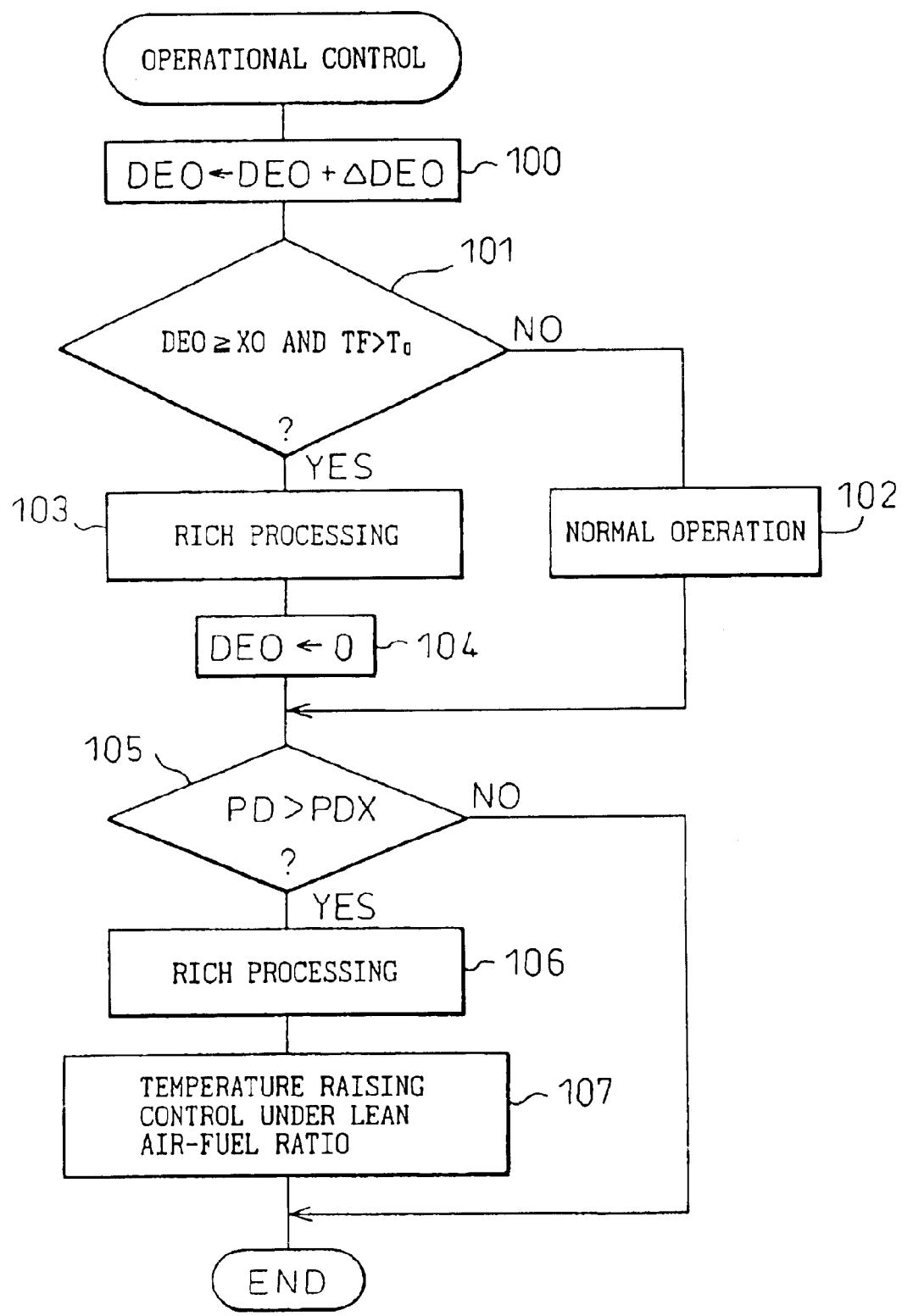
FIG. 8 is a flow chart of control of the operation of an engine.

FIG. 7 and FIG. 8 show a first embodiment. In this embodiment, the drop or increase in the oxidation of the particulate deposited on the particulate filter 22 per unit time is calculated and it is judged if the particulate deposited on the particulate filter 22 has changed in property to a property harder to oxidize compared with right after deposition based on that drop or increase of the oxidation.

Figure 3B:
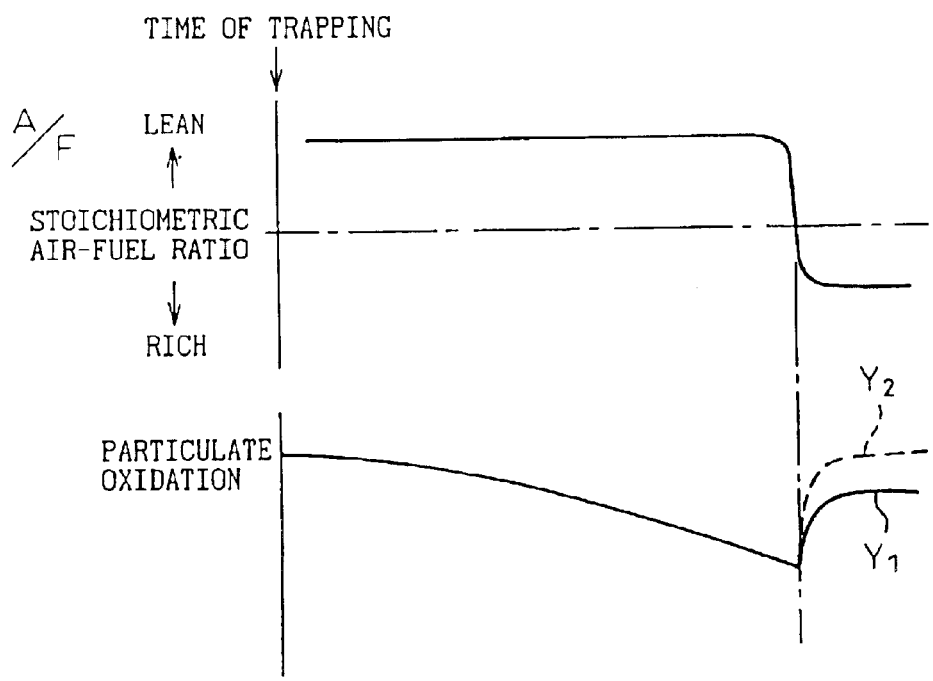

That is, as explained referring to FIGS. 3A and 3B, when the air-fuel ratio A/F is maintained lean, the higher the temperature TF of the particulate filter 22, the lower the oxidation of the particulate. When the air-fuel ratio A/F is rich, the higher the temperature TF of the particulate filter 22, the greater the oxidation of the particulate. Therefore, briefly stated, the drop ΔDEO in the oxidation of particulate per unit time can be expressed as shown in FIG. 7. That is, when the air-fuel ratio A/F is lean, as shown by the solid line L, the drop ΔDEO of the oxidation of the particulate becomes greater the higher the temperature TF of the particulate filter 22. On the other hand, when the air-fuel ratio A/F is rich, as shown by the solid line R, the drop ΔDEO of the oxidation of the particulate becomes negative and the absolute value of the drop ΔDEO, that is, the increase per unit time of the oxidation of the particulate, becomes greater the higher the temperature TF of the particulate filter 22.

Therefore, if calculating the drop ΔDEO of the oxidation of particulate shown in FIG. 7 per unit time and cumulatively adding the calculated drops ΔDEO, it becomes possible to judge the drop in the oxidation of the particulate. In this embodiment, when this drop of the oxidation of the particulate exceeds an allowable limit XO corresponding to LL in FIG. 5, the air-fuel ratio A/F is temporarily made rich.

FIG. 8 shows a flow chart for execution of the first embodiment.

Referring to FIG. 8, first, at step 100, the drop ΔDEO in the oxidation of the particulate calculated based on FIG. 7 is added to DEO. Therefore, this DEO comes to express the drop in the oxidation of the particulate. Next, at step 101, it is judged if the drop DEO in the oxidation of the particulate has exceeded an allowable limit XO and if the temperature TF of the particulate filter 22 is higher than the temperature $T_0$ at which the particulate can be oxidized, for example, 250° C. When DEO<XO or TF<$T_0$, the routine proceeds to step 102, where normal operation is performed. At this time, the particulate is burned continuously under a lean air-fuel ratio. Next, the routine proceeds to step 105.

On the other hand, when it is judged at step 101 that DEO≧XO and TF>$T_0$, the routine proceeds to step 103, where rich processing is performed to temporarily make the air-fuel ratio A/F rich. Due to this, the oxidation of the particulate is restored. Note that even if DEO≧XO, when TF≦$T_0$, the rich processing is not performed. Next, at step 104, DEO is cleared. Next, the routine proceeds to step 105.

At step 105, it is judged if the amount of particulate deposited on the particulate filter 22 has exceeded a predetermined amount, that is, if the pressure drop PD at the particulate filter 22 detected by the pressure sensor 43 has exceeded the allowable limit PDX corresponding to the UL of FIG. 5. When PD>PDX, the routine proceeds to step 106, where rich processing is performed to temporarily make the air-fuel ratio A/F rich. Due to this, the oxidation of the particulate is restored. When this rich processing ends, the routine proceeds to step 107, where temperature raising control is performed to make the temperature TF of the particulate filter 22 rise to at least 600° C. and maintain it at least at 600° C. under the lean air-fuel ratio. Due to this, the particulate deposited on the particulate filter 22 can be made to burn. When the regeneration of the particulate filter 22 is completed, the temperature raising control is stopped and normal operation is performed once again.

FIG. 9 to FIG. 16 show a second embodiment. In the second embodiment, the amount of particulate with the oxidation dropping the most in the particulate deposited on the particulate filter 22 is calculated using a model. When the amount of particulate with the oxidation dropping the most exceeds a predetermined amount, it is judged that the particulate deposited on the particulate filter 22 has changed in property to a property harder to oxidize compared with right after deposition.

Figure 9:
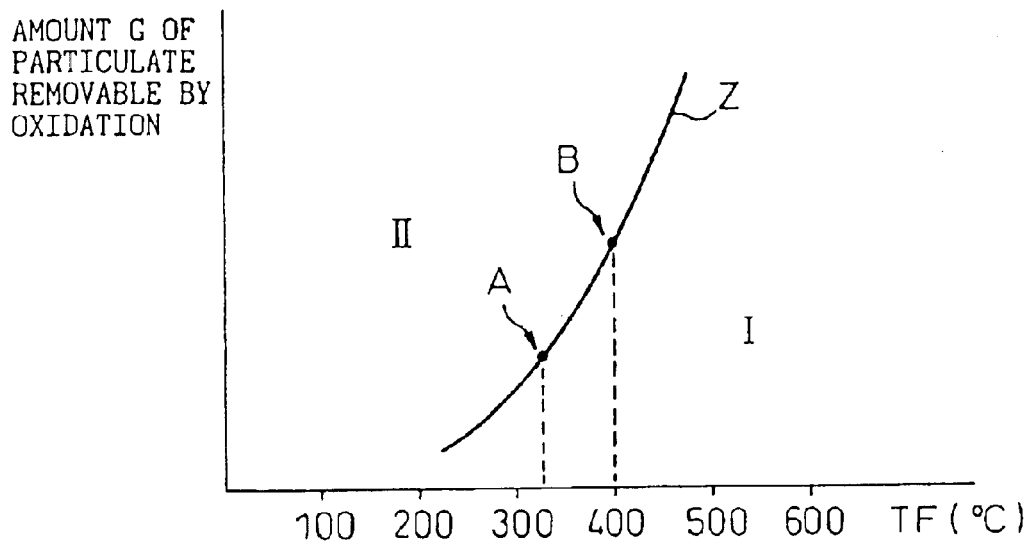
FIG. 9 is a view of the relationship between the amount of particulate removable by oxidation and the temperature of the particulate filter.

First, referring to FIG. 9, the solid line Z in FIG. 9 shows the relation between the oxidation rate of the particulate on the particulate filter 22, that is, for example, the amount G of particulate removable by oxidation per minute (g/min) and the temperature TF of the particulate filter 22. That is, in FIG. 9, the curve Z shows the balance point where the amount of particulate flowing to the particulate filter 22 matches with the amount G of particulate removable by oxidation. At this time, the amount of inflowing particulate and the amount of particulate removed by oxidation are equal, so the amount of the particulate deposited on the particulate filter 22 is maintained constant. On the other hand, in the region I of FIG. 9, the amount of the inflowing particulate is smaller than the amount of particulate removable by oxidation, so the amount of deposited particulate becomes smaller, while in the region II of FIG. 9, the amount of inflowing particulate becomes greater than the amount of particulate removable by oxidation, so the amount of deposited particulate increases.

Figure 10:
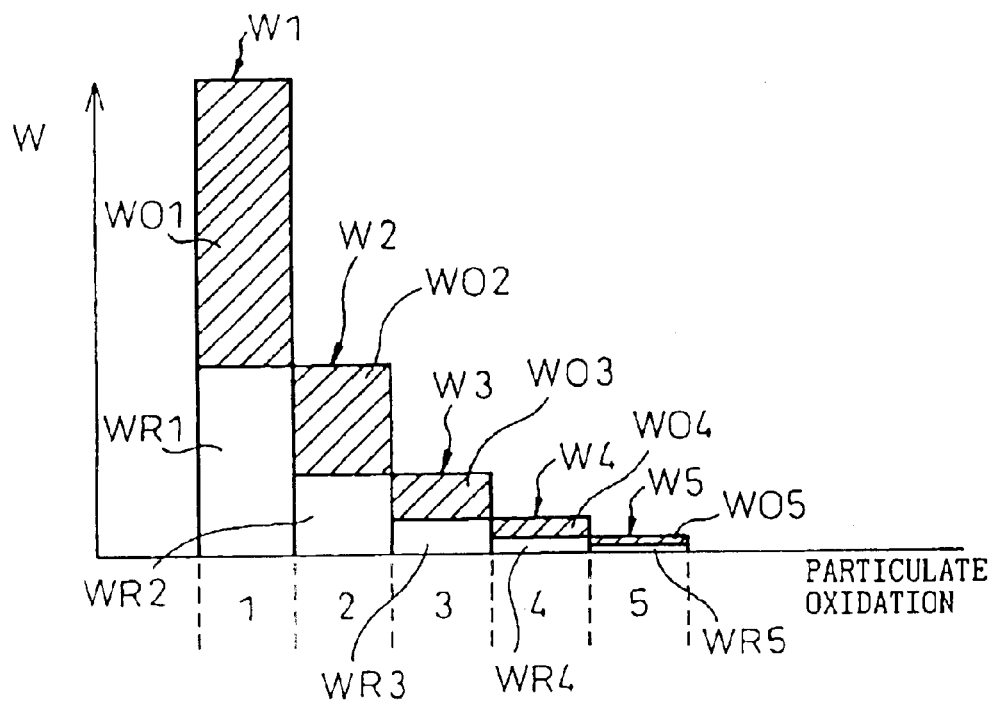
FIG. 10 is a view for explaining the state of deposited particulate.

FIG. 10 schematically shows by modeling the state of the deposited particulate when the amount of inflowing particulate matches with the amount G of particulate removable by oxidation. In FIG. 10, the numerals 1 to 5 running along the abscissa show the oxidation of the deposited particulate. The oxidation becomes worse from the numeral 1 to 5. Further, in FIG. 10, W1, W2, W3, W4, and W5 show the amounts of particulate depositing at certain times with the oxidations 1, 2, 3, 4, and 5. WO1, WO2, WO3, WO4, and WO5 show the amounts of particulate removed by oxidation after a certain time. WR1, WR2, WR3, WR4, and WR5 show the amounts of remaining particulate still deposited at those times.

In this model, it is considered that the particulate W1 flowing into the particulate filter 22 is removed by oxidation to the extent of exactly WO1 over a certain time, so just the particulate WR1 remains and this particulate WR1 falls in oxidation from 1 to 2, then the remaining particulate W2 is removed by oxidation to the extent of exactly WO2 over a certain time, so just the particulate WR2 remains and this particulate WR2 falls in oxidation from 2 to 3. Therefore, as will be understood from FIG. 10, in this model, W2 matches with WR1, W3 matches with WR2, W4 matches with WR3, and W5 matches with WR4.

Further, in this model, the ratios WO1/W1, WO2/W2, WO3/W3, WO4/W4, and WO5/W5 of the amounts WO1, WO2, WO3, WO4, and WO5 of particulate removable by oxidation over a certain time among the amounts of deposited particulate W1, W2, W3, W4, and W5 are fixed. In this case, the more the oxidation of the particulate falls, the smaller these ratios are considered to become. Therefore, in this model, WO1/W1 is made 60 percent, WO2/W2 57 percent, WO3/W3 54 percent, WO4/W4 52 percent, and WO5/W5 50 percent.

Further, since WO5/W5 is 50 percent, WR5/W5 also becomes 50 percent. The remaining particulate WR5 continues to be removed by oxidation over a predetermined time. Considered in this way, the model shown in FIG. 10 was prepared.

Figure 11A:
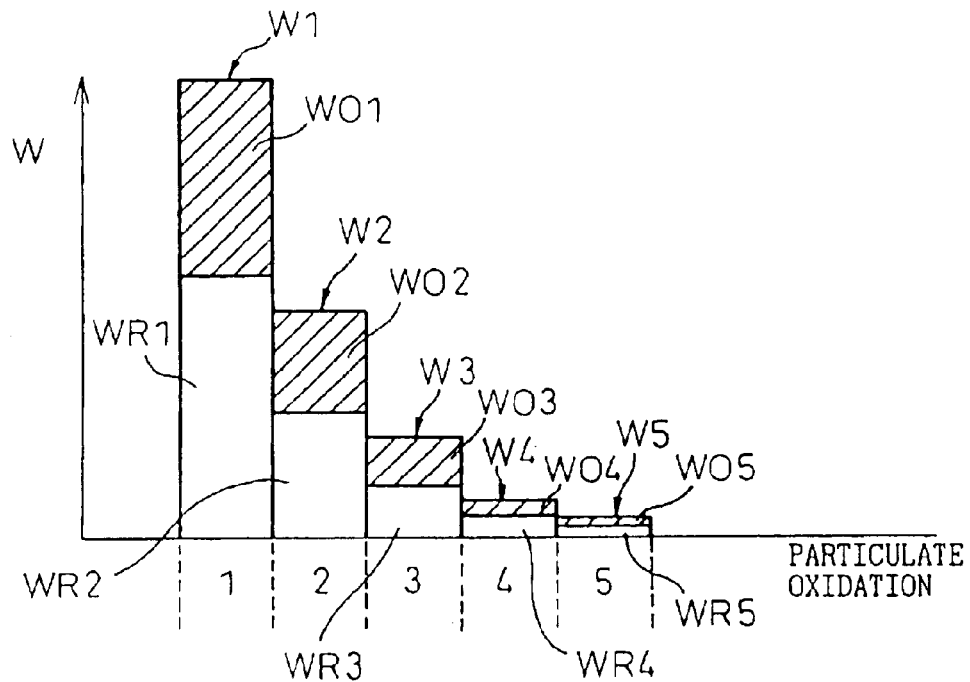
FIGS. 11A and 11B are views for explaining the state of deposited particulate.
Figure 11B:
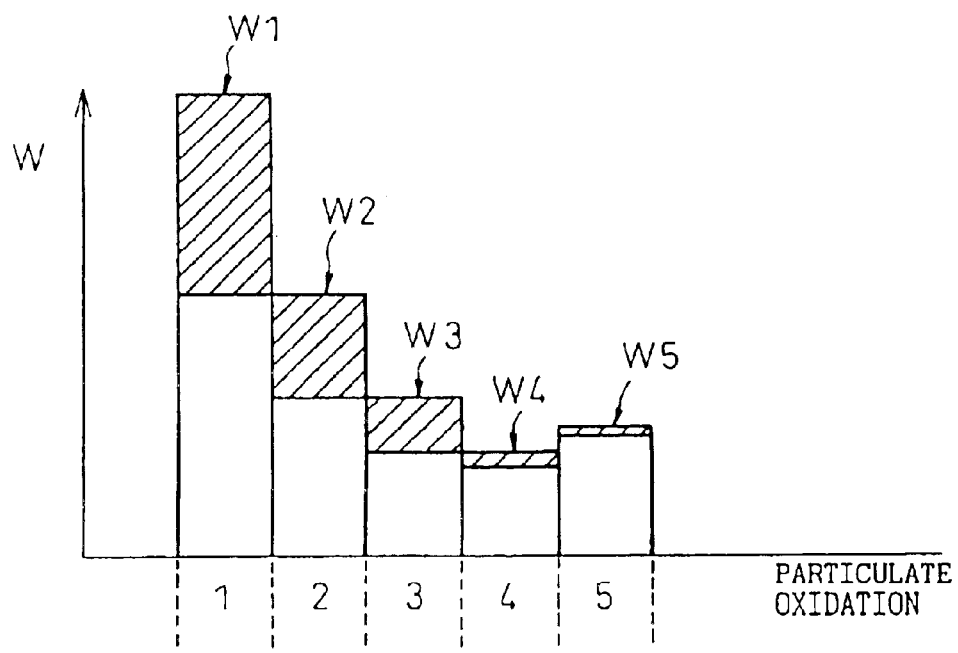

On the other hand, if the amount of inflowing particulate becomes larger than the amount G of particulate removable by oxidation, as shown in FIG. 11A, the ratio of WO1 to W1, the ratio of WO2 to W2, the ratio of WO3 to W3, the ratio of WO4 to W4, and the ratio of WO5 to W5 become smaller compared with the case shown in FIG. 10. As a result, the amounts of remaining particulate WR1, WR2, WR3, WR4, and WR5 increase compared with the case shown in FIG. 10. If this situation continues, as shown in FIG. 11B, the amount of particulate W5 with the oxidation 5 greatly increases.

That is, considering such a model, it becomes possible to find the amount W5 of particulate having the worst oxidation.

Next, the method of calculating the amount W5 of particulate having the worst oxidation will be briefly explained.

Figure 12A:
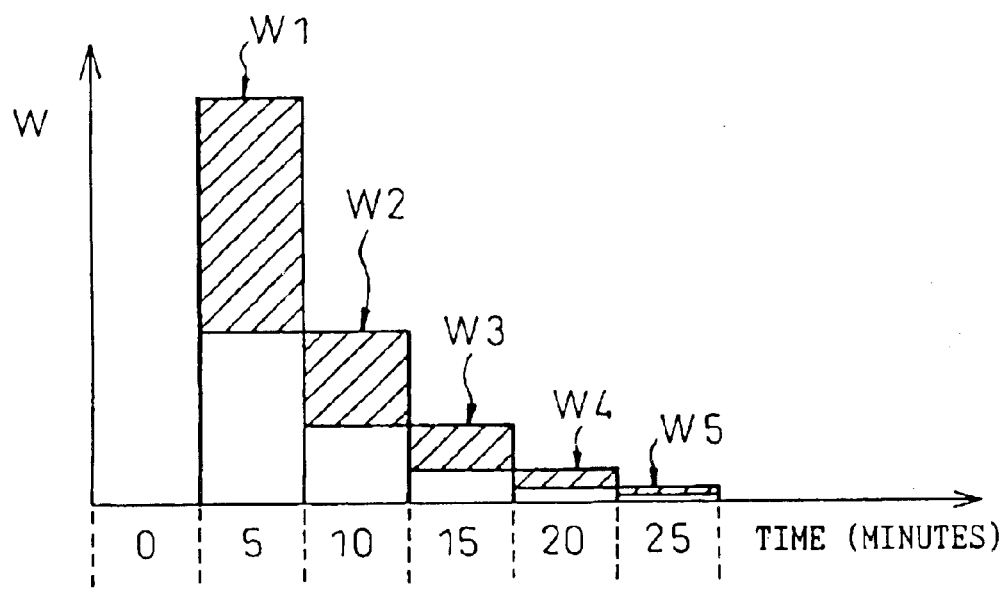
FIGS. 12A and 12B are views for explaining the state of deposited particulate.
Figure 12B:
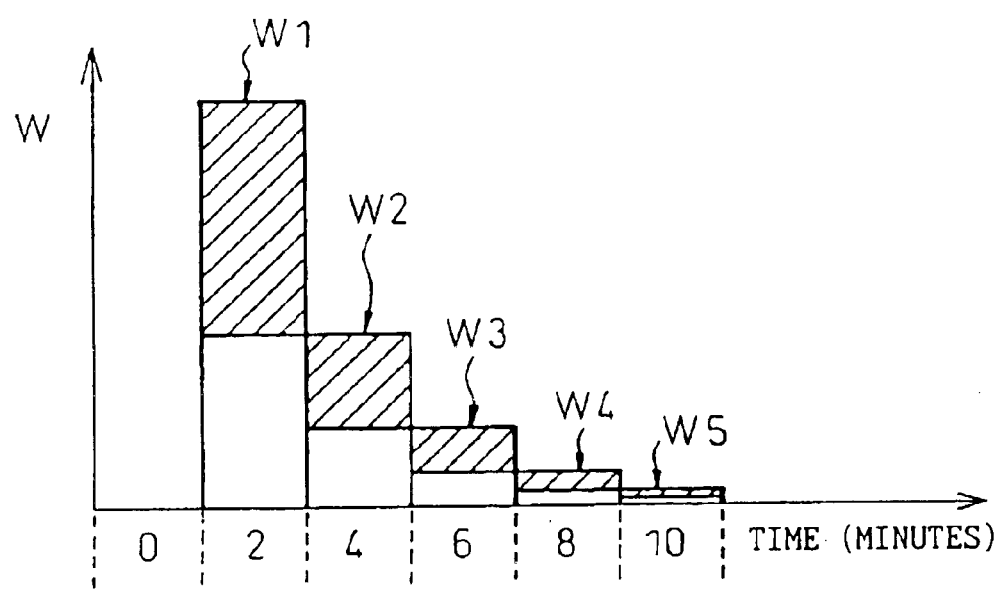

FIG. 12A and FIG. 12B show the cases where the balance point between the amount of inflowing particulate and the amount of particulate removable by oxidation are the point A and the point B in FIG. 9. FIGS. 12A and 12B show the states of particulate in the same way as in FIG. 10, but in FIGS. 12A and 12B, the abscissa indicates the time. That is, in FIG. 12A, the abscissa indicates 5 minutes, 10 minutes, 15 minutes, 20 minutes, and 25 minutes after the particulate flows in. In FIG. 12B, the abscissa indicates 2 minutes, 4 minutes, 6 minutes, 8 minutes, and 10 minutes after the particulate flows in.

The point B of FIG. 9 is larger in amount G of particulate removable by oxidation, that is, the amount of inflowing particulate, compared with the point A, so the amount W1 of particulate in FIG. 12B becomes larger than the amount W1 of particulate in FIG. 12A. On the other hand, the point B of FIG. 9 is higher in temperature TF of the particulate filter 22 compared with the point A, so the oxidation of the particulate falls early. Despite this, the fact that the particulate is made to be removed by oxidation before the oxidation becomes 5 means that the particulate is made to be removed by oxidation early as shown by FIG. 12B.

The time $\Delta t$ required for 60% of the particulate W1 to be removed by oxidation or the time $\Delta t$ required for 57% of the particulate W2 to be removed by oxidation is 5 minutes in FIG. 12A and 2 minutes in FIG. 12B. In this way, the time $\Delta t$ becomes shorter the higher the temperature TF of the particulate filter 22 as shown in FIG. 13.

In this embodiment, each time the time $\Delta t$ passes, the amounts WR1, WR2, WR3, WR4, and WR5 of remaining particulate are calculated. When the amount WR5 of remaining particulate exceeds the allowable limit WRX corresponding to LL in FIG. 5, the air-fuel ratio A/F is temporarily made rich.

Figure 14A:
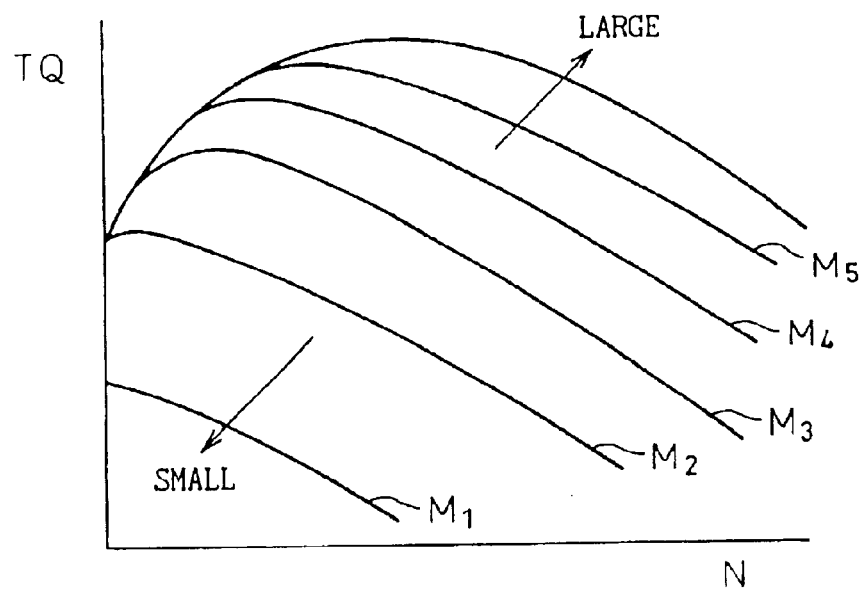
FIGS. 14A and 14B are views of the amount of exhausted particulate.

Further, calculation of the amount of remaining particulate requires that the amount of inflowing particulate, that is, the amount of exhausted particulate exhausted from the engine, be found. This amount of exhausted particulate changes depending on the model of the engine, but if the model of the engine is determined, becomes a function of the required torque TQ and the engine rotational speed N. FIG. 14A shows the amount M of exhausted particulate of the internal combustion engine shown in FIG. 1. The curves M1, M2, M3, M4, and M5 show the amounts of exhausted particulate (M1<M2<M3<M4<M5). In the example shown in FIG. 14A, the higher the required torque TQ, the greater the amount M of exhausted particulate. Note that the amount M of exhausted particulate shown in FIG. 14A is stored in advance as a function of the required torque TQ and the engine rotational speed N in the ROM 32 in the form of the map shown in FIG. 14B.

Figure 15:
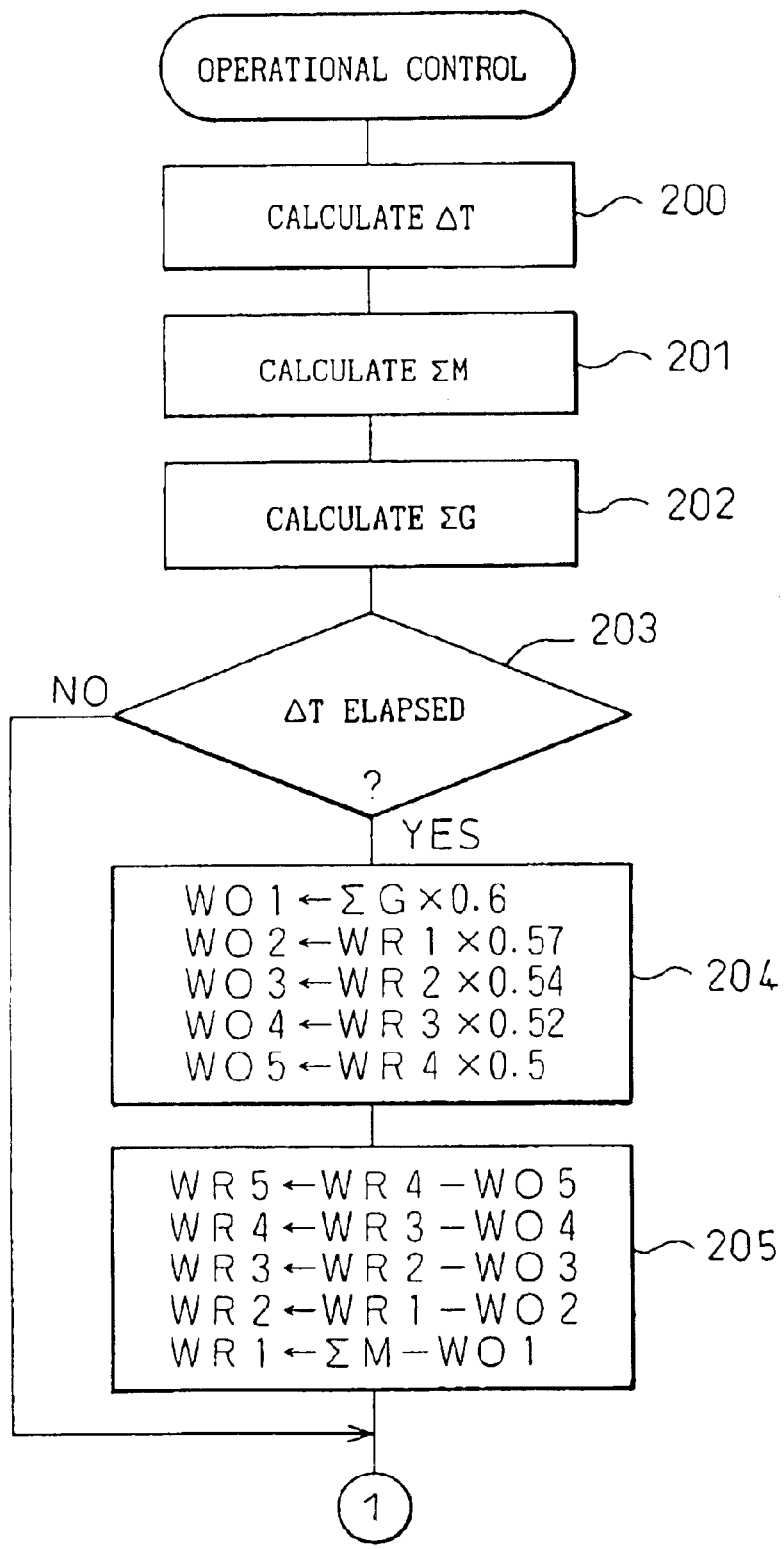
FIGS. 15 and 16 are flow charts of control of the engine.
Figure 16:
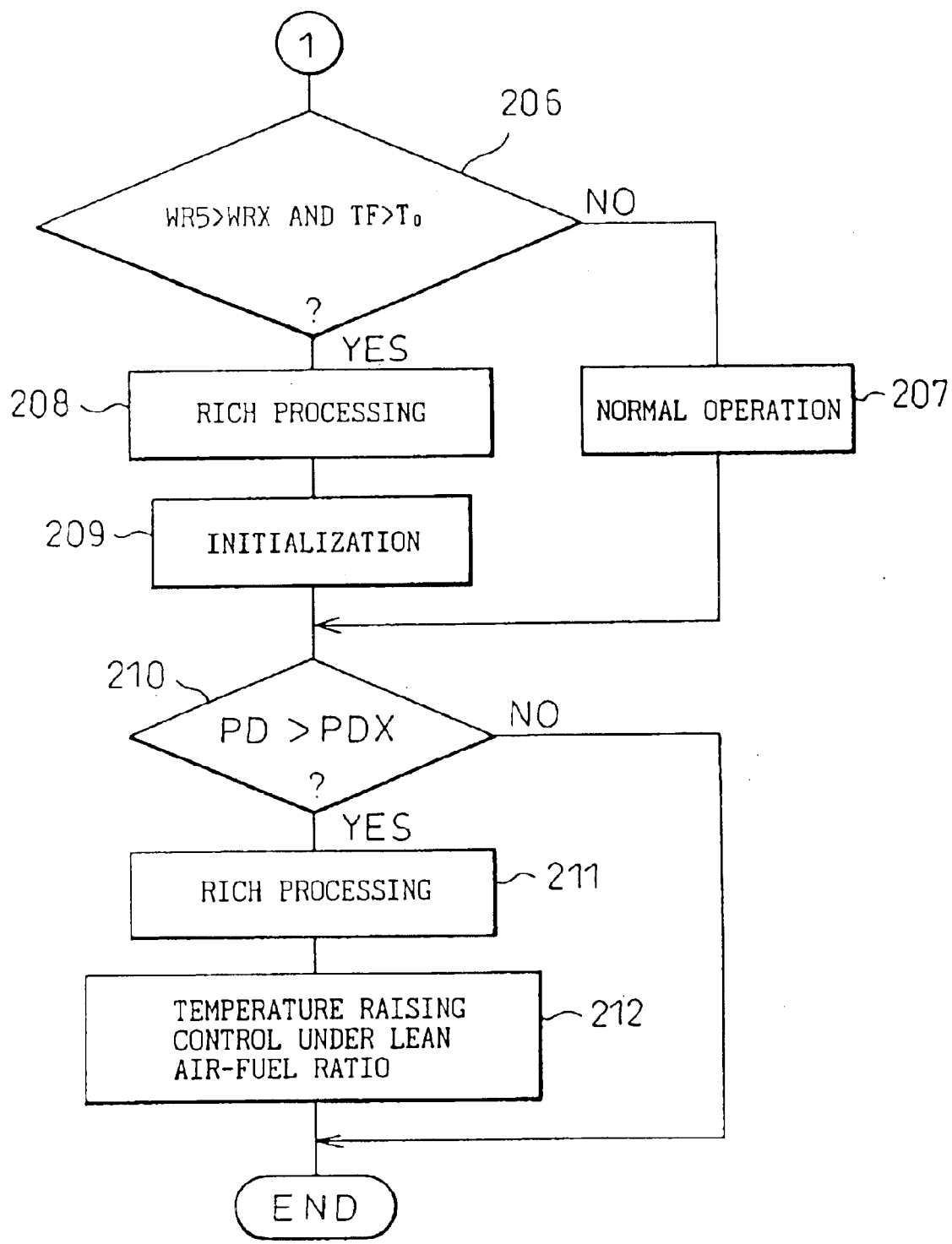

FIG. 15 and FIG. 16 show flow charts for execution of the second embodiment.

Figure 14B:
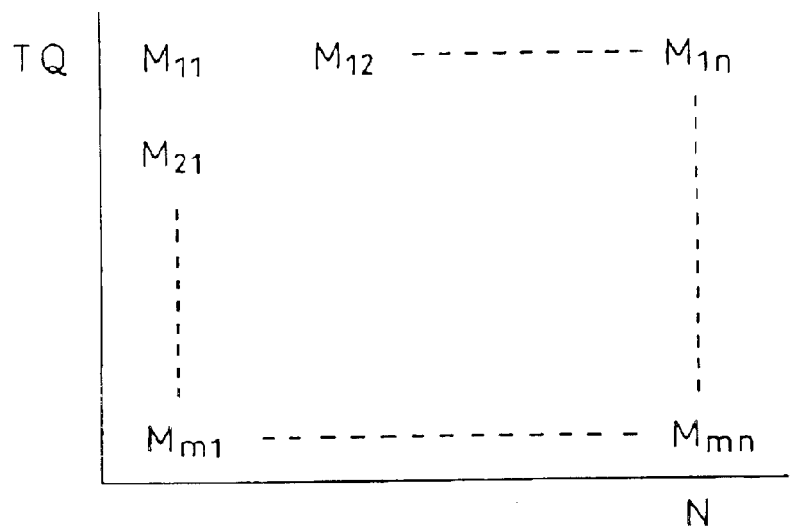

Referring to FIG. 15 and FIG. 16, first, at step 200, the time $\Delta t$ is calculated from the relation shown in FIG. 13. Next, at step 201, the cumulative amount $\Sigma M$ of the amount M of exhausted particulate at the time $\Delta t$ shown in FIG. 14B is calculated. Next, at step 202, the cumulative amount $\Sigma G$ of the amount G of particulate removable by oxidation at the time $\Delta t$ shown in FIG. 9 is calculated. Next, at step 203, it is judged if the time $\Delta t$ has elapsed. When the time $\Delta t$ has elapsed, the routine proceeds to step 204.

At step 204, the amounts of particulate removable by oxidation WO1 (=$\Sigma G \times 0.6$), WO2 (=WR1×0.57), WO3 (=WR2×0.54), WO4 (=WR3×0.52), and WO5 (=WR4×0.5) are calculated. Next, at step 205, the remaining amounts of particulate WR5, WR4, WR3, WR2, and WR1 are calculated based on the following relations:

WR5←WR4–WO5

WR4←WR3–WO4

WR3←WR2–WO3

WR2←WR1–WO2

WR1←$\Sigma M$-WO1

The meanings of these relations are believed to be clear from FIG. 10, so explanations thereof will be omitted.

Next, at step 206, it is judged if the remaining amount of particulate WR5 has exceeded an allowable limit WRX and if the temperature TF of the particulate filter 22 is higher than the temperature $T_0$ at which the particulate can be oxidized, for example, 250° C. When WR5≦WRX or TF≦$T_0$, the routine proceeds to step 207, where normal operation is performed. At this time, the particulate is burned continuously under a lean air-fuel ratio. Next, the routine proceeds to step 210.

On the other hand, when it is judged at step 206 that WR5>WRX and TF>$T_0$, the routine proceeds to step 208, where rich processing is performed to temporarily make the air-fuel ratio A/F rich. Due to this, the oxidation of the particulate is restored. Note that even if WR5>WRX, when TF≦$T_0$, the rich processing is not performed. Next, at step 209, initialization is performed. Next, the routine proceeds to step 210.

At step 210, it is judged if the amount of particulate deposited on the particulate filter 22 has exceeded a predetermined amount, that is, if the pressure drop PD at the particulate filter 22 detected by the pressure sensor 43 has exceeded the allowable limit PDX corresponding to the UL of FIG. 5. When PD>PDX, the routine proceeds to step 211, where rich processing is performed to temporarily make the air-fuel ratio A/F rich. Due to this, the oxidation of the particulate is restored. When this rich processing ends, the routine proceeds to step 212, where temperature raising control is performed to make the temperature TF of the particulate filter 22 rise to at least 600° C. and maintain it at least at 600° C. under the lean air-fuel ratio. Due to this, the particulate deposited on the particulate filter 22 can be made to burn. When the regeneration of the particulate filter 22 is completed, the temperature raising control is stopped and normal operation is performed once again.

FIGS. 17A, 17B, and 17C and FIG. 18 show a third embodiment. In this embodiment, on the one hand the pressure drop at the particulate filter 22 is estimated, while on the other hand, the actual pressure drop at the particulate filter 22 is detected and the pressure difference between the estimated pressure drop and the actual pressure drop is used to judge if the particulate deposited on the particulate filter 22 has changed in property to a property harder to oxidize compared with right after deposition. That is, when the oxidation of the particulate falls, the particulate deposits without being fully oxidized, so the pressure drop at the particulate filter 22 increases. Therefore, it is possible to judge from this if the oxidation of the particulate has fallen.

Figure 17A:
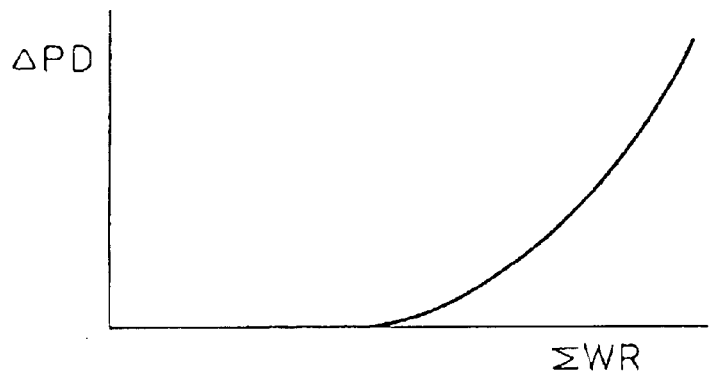
FIGS. 17A, 17B, and 17C are views for explaining a change in pressure drop.

Therefore, first, the method for estimating the pressure drop at the particulate filter 22 will be explained. In this embodiment, the cumulative amount ΣWR of the particulate is calculated from the amount M of exhausted particulate and the amount G of particulate removable by oxidation. FIG. 17A shows the relationship between the cumulative amount ΣWR of the particulate and the pressure drop ΔPD in the standard state. Therefore, if the cumulative amount ΣWR of the particulate is found, the pressure drop ΔPD at the standard state is found from the relationship shown in FIG. 17A.

Figure 17B:
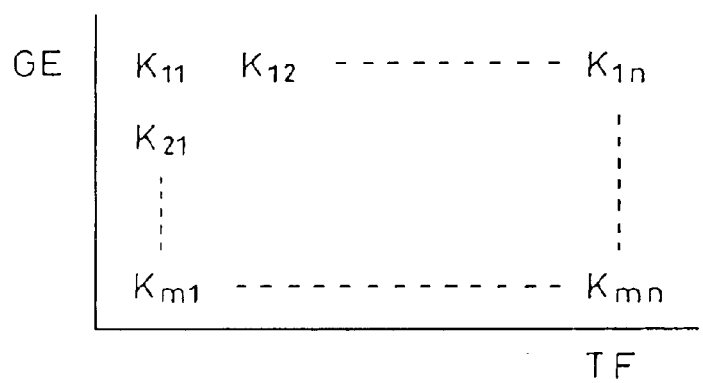

On the other hand, even if the cumulative amount ΣWR of the particulate is the same, if the temperature TF of the particulate filter 22 and the amount GE of the exhaust gas change, the pressure drop changes along with them. In this embodiment of the present invention, a correction coefficient K for the pressure drop ΔPD in the standard state is stored in advance in the ROM 32 in the form of a map as shown in FIG. 17B. By multiplying the correction coefficient K with the pressure drop ΔPD, the pressure drop PDD corresponding to the temperature TF of the particulate filter 22 and the amount GE of the exhaust gas is calculated.

Figure 17C:
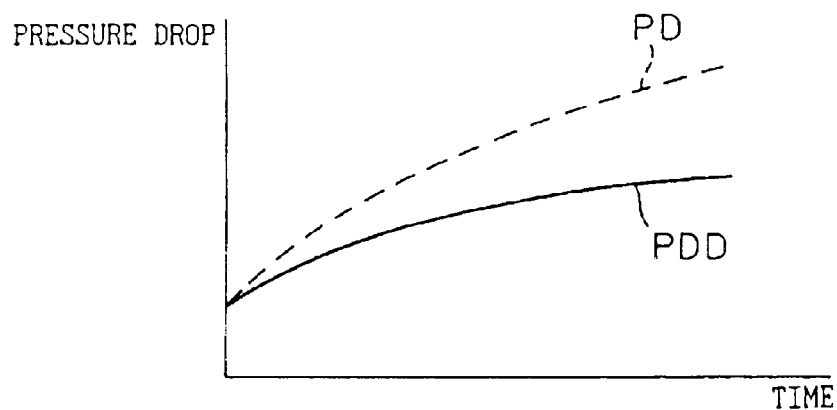

If the oxidation of the particulate falls, as shown in FIG. 17C, the actual pressure drop PD detected by the pressure sensor 43 becomes higher than the pressure drop PDD calculated. In the third embodiment, when the difference of these pressure drops (PD−PDD) exceeds a setting PX, the air-fuel ratio A/F is temporarily made rich.

Figure 18:
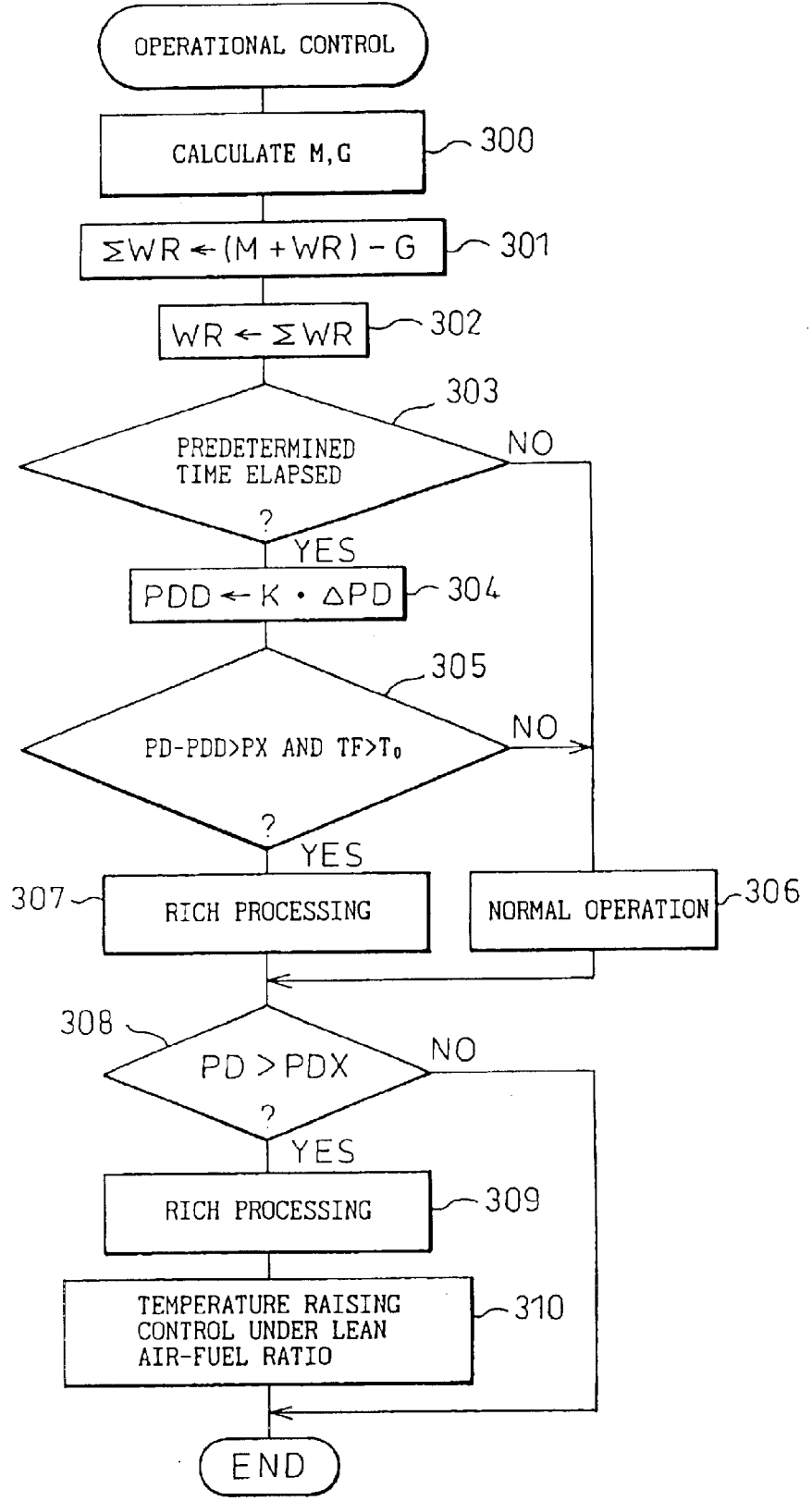
FIG. 18 is a flow chart of control of operation of the engine.

FIG. 18 shows a flow chart for execution of the third embodiment.

Referring to FIG. 18, first, at step 300, the amount M of exhausted particulate is calculated from the map shown in FIG. 14B and the amount G of particulate removable by oxidation is calculated from the relation shown in FIG. 9. Next, at step 301, the amount G of particulate removable by oxidation is subtracted from the sum (M+WR) of the amount WR of particulate deposited at the time of the previous processing cycle and the amount M of the exhausted particulate so as to calculate the current cumulative amount ΣWR of deposited particulate (=(M+WR)−G). Next, at step 302, ΣWR is made WR.

Next, at step 303, it is judged if a predetermined time has elapsed. When the predetermined time has not elapsed, the routine jumps to step 306, while when the predetermined time has elapsed, the routine proceeds to step 304. At step 304, the pressure drop ΔPD is calculated from the relation shown in FIG. 17A based on the amount ΣWR of deposited particulate. An estimated value PDD of the pressure drop is calculated from this pressure drop ΔPD and the correction coefficient K shown in FIG. 17B. Next, at step 305, it is judged if the pressure difference (PD−PDD) between the actual pressure drop PD detected by the pressure sensor 43 and the estimated value PDD of the pressure drop has become larger than a setting PX and if the temperature TF of the particulate filter 22 is higher than the temperature $T_0$ at which the particulate can be oxidized, for example, 250° C.

When PD−PDD≦PX or TF≦$T_0$, the routine proceeds to step 306, where normal operation is performed. At this time, the particulate is burned continuously under a lean air-fuel ratio. Next, the routine proceeds to step 308.

On the other hand, when it is judged at step 305 that PD−PDD>PX and TF>$T_0$, the routine proceeds to step 307, where rich processing is performed to temporarily make the air-fuel ratio A/F rich. Due to this, the oxidation of the particulate is restored. Note that even if PD−PDD>PX, when TF≦$T_0$, the rich processing is not performed. Next, the routine proceeds to step 308.

At step 308, it is judged if the amount of particulate deposited on the particulate filter 22 has exceeded a predetermined amount, that is, if the pressure drop PD at the particulate filter 22 detected by the pressure sensor 43 has exceeded the allowable limit PDX corresponding to the UL of FIG. 5. When PD>PDX, the routine proceeds to step 309, where rich processing is performed to temporarily make the air-fuel ratio A/F rich. Due to this, the oxidation of the particulate is restored. When this rich processing ends, the routine proceeds to step 310, where temperature raising control is performed to make the temperature TF of the particulate filter 22 rise to at least 600° C. and maintain it at least at 600° C. under the lean air-fuel ratio. Due to this, the particulate deposited on the particulate filter 22 can be made to burn. When the regeneration of the particulate filter 22 is completed, the temperature raising control is stopped and normal operation is performed once again.

FIGS. 19A, 19B, and 19C and FIG. 20 show a fourth embodiment. In this embodiment, the temperature TF of the particulate filter 22 is temporarily raised to about 450° C. to make part of the deposited particulate oxidize and it is judged if the oxidation of the particulate has fallen from the subsequent magnitude of the pressure drop. That is, if the temperature TF of the particulate filter 22 is made to rise, when the oxidation of the particulate is high, a large amount of the deposited particulate will oxidize, but when the oxidation of the particulate is low, almost none of the deposited particulate will oxidize. Therefore, the pressure drop after making the temperature TF of the particulate filter 22 rise becomes lower as shown by PDD in FIG. 19A when the oxidation of the particulate is high, while becomes higher as shown by PD in FIG. 19A when the oxidation of the particulate is low. Therefore, it becomes possible to judge if the oxidation of the particulate has fallen from the difference between the pressure drops PD and PDD.

Figure 19A:
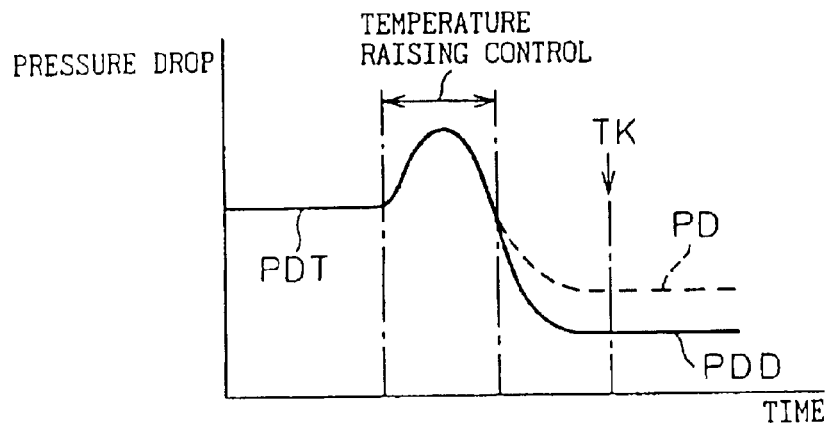
FIGS. 19A, 19B, and 19C are views for explaining a change in pressure drop.
Figure 19B:
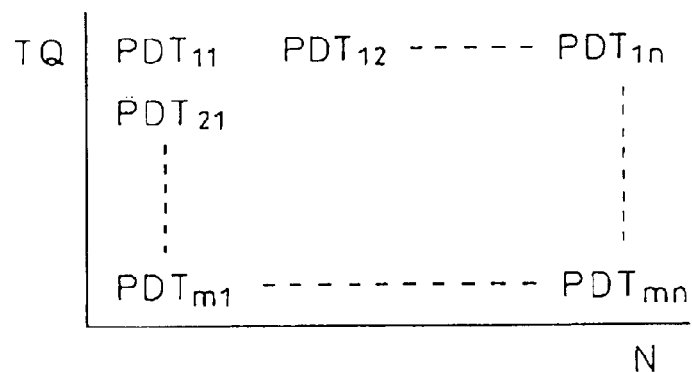
Figure 19C:
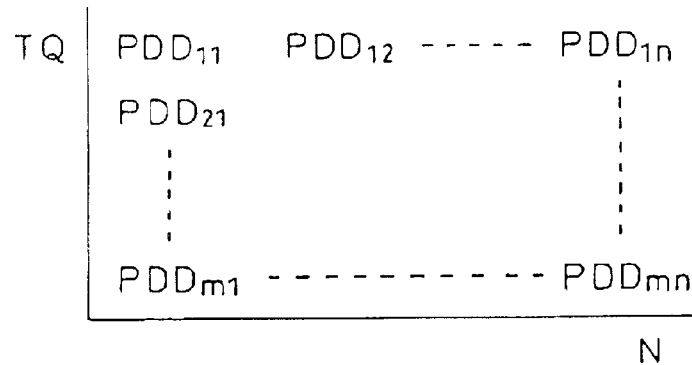

Specifically speaking, in this embodiment, temperature raising control of the particulate filter 22 is performed when the actual pressure drop PD detected by the pressure sensor 43 becomes a predetermined target value PDT. This target value PDT is stored in advance in the ROM 32 as a function of the required torque TQ and the engine rotational speed N as shown in FIG. 19B. Next, after the temperature raising control is ended, when the judging timing TK shown in FIG. 19A is reached, the actual pressure drop PD and the pressure drop PDD when the oxidation of the particulate is high are compared. This pressure drop PDD is found in advance by experiments etc. The pressure drop PDD is stored in advance in the ROM 32 as a function of the required torque TQ and the engine rotational speed N as shown in FIG. 19C. In this embodiment, when the pressure difference (PD−PDD) exceeds a setting PXX, the air-fuel ratio A/F is temporarily made rich.

Figure 20:
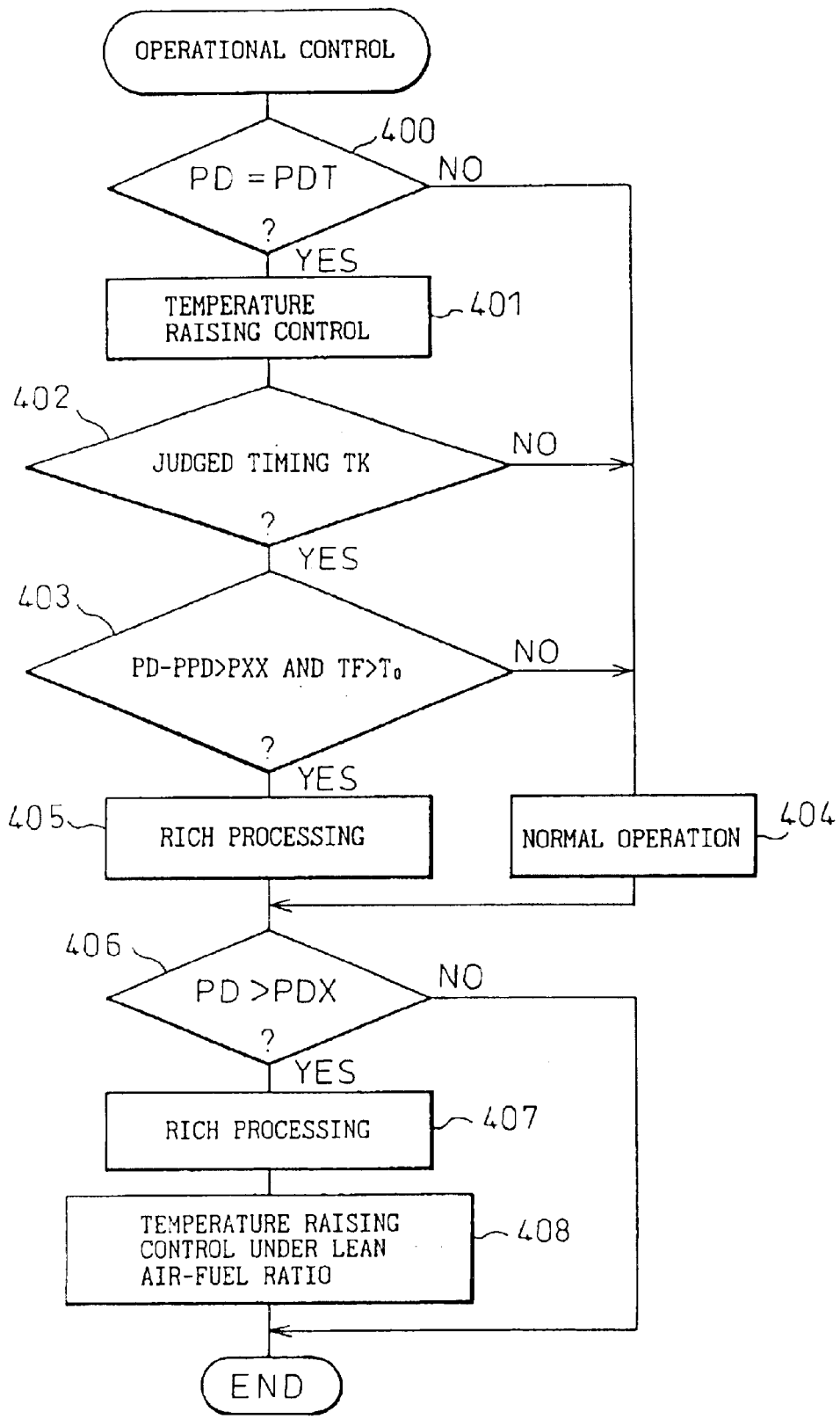
FIG. 20 is a flow chart of control of operation of the engine.

FIG. 20 shows a flow chart for execution of the fourth embodiment.

Referring to FIG. 20, first, at step 400, it is judged if the actual pressure drop PD detected by the pressure sensor 43 has become a target value PDT shown in FIG. 19B. When PD is not PDT, the routine jumps to step 404, while when PD=PDT, the routine proceeds to step 401. At step 401, temperature raising control is performed to make the temperature TF of the particulate filter 22 temporarily rise. When the temperature raising control is ended, the routine proceeds to step 402, where it is judged if the judgement timing TK shown in FIG. 19A has been reached. When the judgement timing TK has been reached the routine proceeds to step 403, where it is judged if the pressure difference (PD−PDD) between the actual pressure PD detected by the pressure sensor 43 and the pressure drop PDD found from the map shown in FIG. 19C has become larger than a setting PXX and if the temperature TF of the particulate filter 22 is higher than the temperature $T_0$ at which the particulate can be oxidized, for example, 250° C.

When PP−PPD≦PXX or TF≦$T_0$, the routine proceeds to step 404, where normal operation is performed. At this time, the particulate is burned continuously under a lean air-fuel ratio. Next, the routine proceeds to step 406.

On the other hand, when it is judged at step 403 that PD−PDD>PXX and TF>$T_0$, the routine proceeds to step 405, where rich processing is performed to temporarily make the air-fuel ratio A/F rich. Due to this, the oxidation of the particulate is restored. Note that even if PD−PDD>PXX, when TF≦$T_0$, the rich processing is not performed. Next, the routine proceeds to step 406.

At step 406, it is judged if the amount of particulate deposited on the particulate filter 22 has exceeded a predetermined amount, that is, if the pressure drop PD at the particulate filter 22 detected by the pressure sensor 43 has exceeded the allowable limit PDX corresponding to the UL of FIG. 5. When PD>PDX, the routine proceeds to step 407, where rich processing is performed to temporarily make the air-fuel ratio A/F rich. Due to this, the oxidation of the particulate is restored. When this rich processing ends, the routine proceeds to step 408, where temperature raising control is performed to make the temperature TF of the particulate filter 22 rise to at least 600° C. and maintain it at least at 600° C. under the lean air-fuel ratio. Due to this, the particulate deposited on the particulate filter 22 can be made to burn. When the regeneration of the particulate filter 22 is completed, the temperature raising control is stopped and normal operation is performed once again.

Next, a fifth embodiment will be explained. It is possible to predict to a certain extent if the particulate deposited on the particulate filter 22 has changed in property to a property harder to oxidize compared with right after deposition. For example, at the time of engine startup, the temperature TF of the particulate filter 22 is low, so a large amount of particulate deposits on the particulate filter 22 without being oxidized. This particulate will not immediately oxidize even if the temperature of the particulate filter 22 becomes high. Therefore, a large amount of particulate will continue depositing on the particulate filter 22. During this time, the oxidation of the particulate will end up falling. Further, if high speed operation is continued, the particulate is exposed to a high temperature over a long time under a lean air-fuel ratio and therefore the oxidation of the particulate will fall. Therefore, at the time of engine startup or when high speed operation continues for more than a predetermined time, it becomes possible to predict that the particulate deposited on the particulate filter 22 has changed in property to a property harder to oxidize compared with right after deposition.

Further, if the engine continues operating for more than a certain time, the oxidation of the particulate may be considered to drop during that time. Therefore, it also becomes possible to predict that the particulate deposited on the particulate filter 22 has changed in property to a property harder to oxidize compared with right after deposition when the engine operating time, cumulative value of the engine revolutions, or the vehicle running distance exceed predetermined values as well.

Therefore, in this embodiment, when it is predicted that the particulate deposited on the particulate filter 22 has changed in property to a property harder to oxidize compared with right after deposition, the air-fuel ratio A/F is temporarily made rich.

Figure 21:
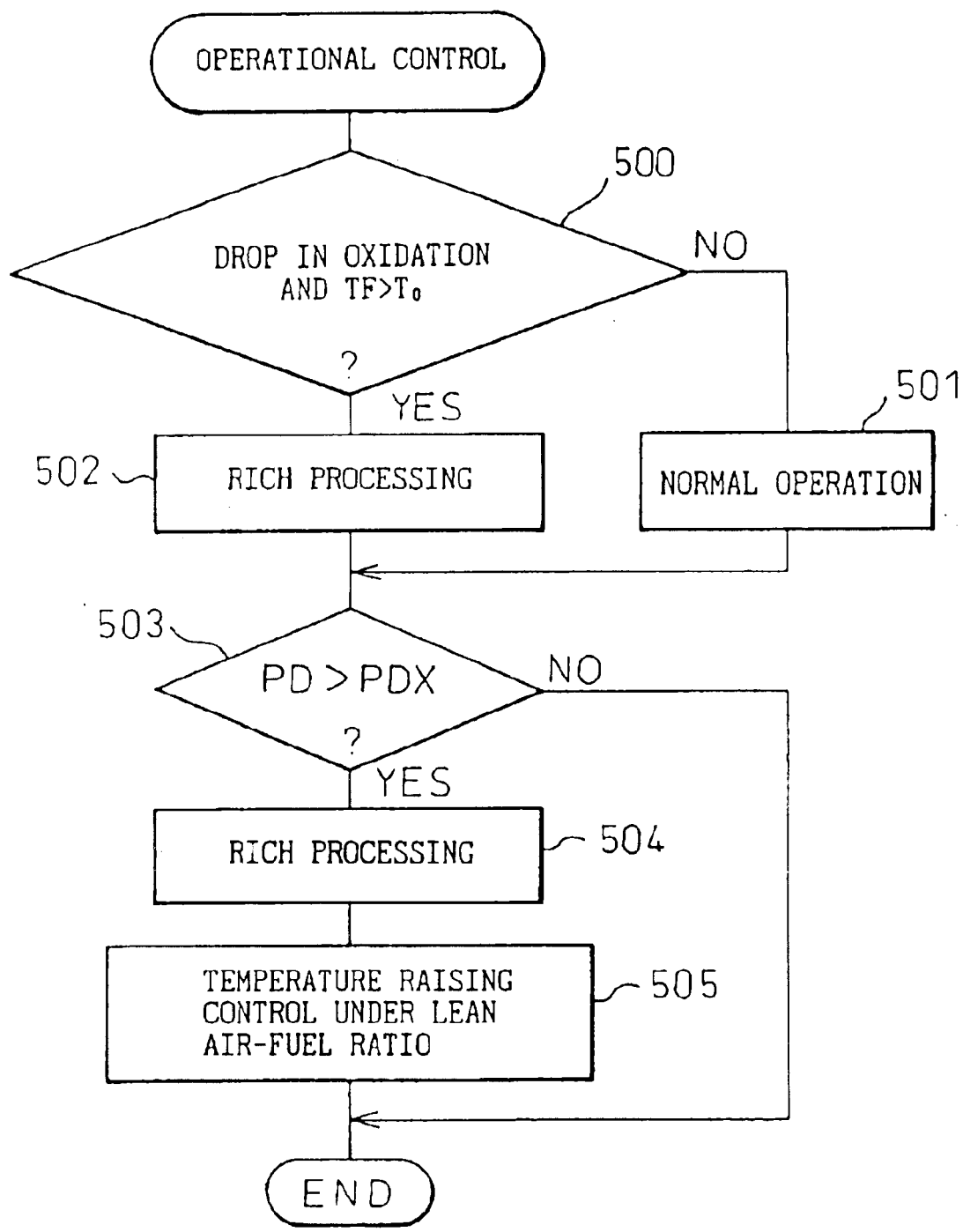
FIG. 21 is a flow chart of control of operation of the engine.

FIG. 21 shows a flow chart for execution of the fifth embodiment.

Referring to FIG. 21, first, at step 500, it is judged if it can be predicted that the particulate deposited on the particulate filter 22 has changed in property to a property harder to oxidize compared with right after deposition and if the temperature TF of the particulate filter 22 is higher than the temperature $T_0$ at which the particulate can be oxidized, for example, 250° C. When it cannot be predicted that the particulate deposited on the particulate filter 22 has changed in property to a property harder to oxidize compared with right after deposition or TF≦$T_0$, the routine proceeds to step 501, where normal operation is performed. At this time, the particulate is burned continuously under a lean air-fuel ratio. Next, the routine proceeds to step 503.

On the other hand, when it can be predicted that the particulate deposited on the particulate filter 22 has changed in property to a property harder to oxidize compared with right after deposition and TF>$T_0$, the routine proceeds to step 502, where rich processing is performed to temporarily make the air-fuel ratio A/F rich. Due to this, the oxidation of the particulate is restored. Note that even if it can be predicted that the particulate deposited on the particulate filter 22 has changed in property to a property harder to oxidize compared with right after deposition, when TF≦$T_0$, the rich processing is not performed. Next, the routine proceeds to step 503.

At step 503, it is judged if the amount of particulate deposited on the particulate filter 22 has exceeded a predetermined amount, that is, if the pressure drop PD at the particulate filter 22 detected by the pressure sensor 43 has exceeded the allowable limit PDX corresponding to the UL of FIG. 5. When PD>PDX, the routine proceeds to step 504, where rich processing is performed to temporarily make the air-fuel ratio A/F rich. Due to this, the oxidation of the particulate is restored. When this rich processing ends, the routine proceeds to step 505, where temperature raising control is performed to make the temperature TF of the particulate filter 22 rise to at least 600° C. and maintain it at least at 600° C under the lean air-fuel ratio. Due to this, the particulate deposited on the particulate filter 22 can be made to burn. When the regeneration of the particulate filter 22 is completed, the temperature raising control is stopped and normal operation is performed once again.

Next, the method of low temperature combustion suitable for working the present invention will be explained in brief with reference to FIG. 22 to FIG. 24.

In the internal combustion engine shown in FIG. 1, when the EGR rate (amount of EGR gas/amount of EGR gas+ amount of intake air) is increased, the amount of generation of smoke gradually increases and peaks. IF the EGR rate is further increased, this time the amount of generation of smoke rapidly falls. This will be explained while referring to FIG. 22 showing the relationship between the EGR rate and smoke when changing the degree of cooling of the EGR gas. Note that in FIG. 22, the curve A shows the case of force cooling the EGR gas to maintain the temperature of the EGR gas at about 90° C., the curve B shows the case of cooling the EGR gas by a small-sized cooling device, and the curve C shows the case of not force cooling the EGR gas.

Figure 22:
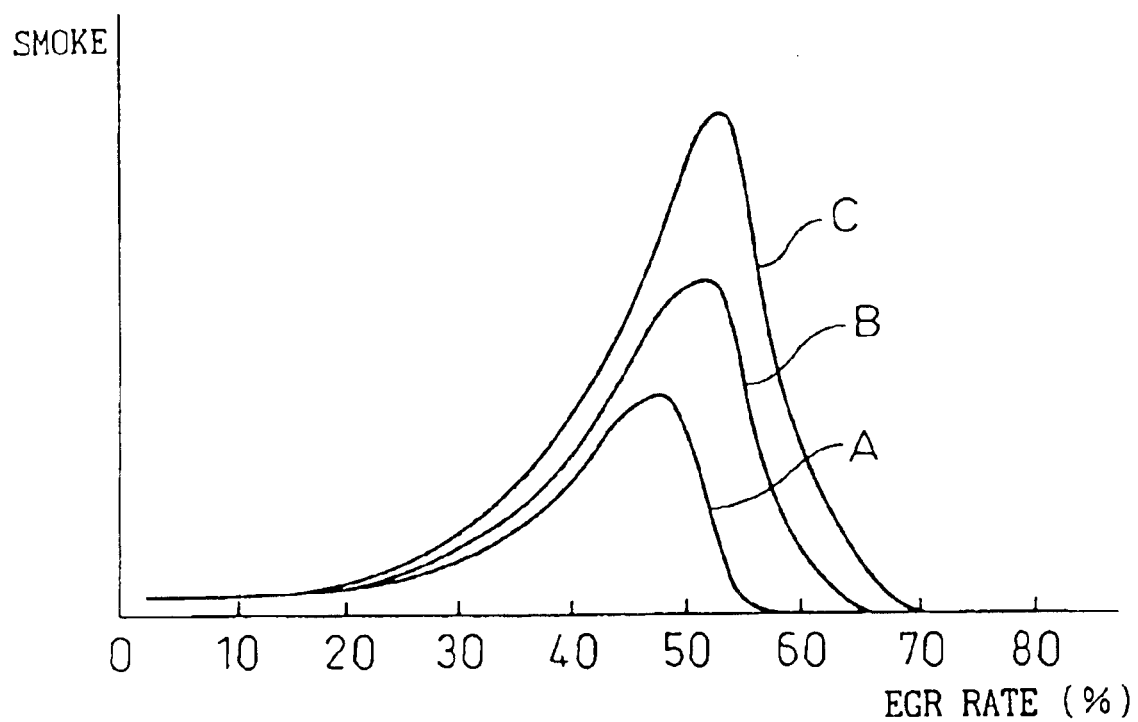
FIG. 22 is a view of the amount of generation of smoke.

As shown by the curve A of FIG. 22, when force cooling the EGR gas, the amount of generation of smoke peaks where the EGR rate becomes slightly lower than 50 percent. In this case, if making the EGR rate more than about 55 percent, almost no smoke is generated any longer. On the other hand, as shown by the curve B of FIG. 22, when slightly cooling the EGR gas, the amount of generation of smoke peaks where the EGR rate is slightly higher than 50 percent. In this case, if making the EGR rate at least about 65 percent, almost no smoke is generated any longer. Further, as shown by the curve C in FIG. 22, when the EGR gas is not force cooled, the amount of generation of smoke peaks near an EGR rate of 55 percent. In this case, if making the EGR rate at least about 70 percent, almost no smoke is generated any longer.

The reason why making the EGR gas rate at least 55 percent in this way results in no smoke being generated any longer is that the temperature of the fuel and the surrounding gas at the time of combustion does not become that high due to the endothermic action of the EGR gas, that is, low temperature combustion is performed, and as a result the hydrocarbon does not grow into soot.

This low temperature combustion has the feature of being able to reduce the amount of generation of $NO_x$ while suppressing the generation of smoke regardless of the air-fuel ratio. That is, if the air-fuel ratio is made rich, the fuel becomes in excess, but the combustion temperature is suppressed to a low temperature, so the excess fuel does not grow into soot and therefore smoke is not generated. Further, at this time, only an extremely small amount of $NO_x$ is also generated. On the other hand, when the average air-fuel ratio is lean or the air-fuel ratio is the stoichiometric air-fuel ratio, if the combustion temperature becomes high, a small amount of soot is generated, but under low temperature combustion, the combustion temperature is suppressed to a low temperature, so no smoke at all is generated and only a very small amount of $NO_x$ is generated as well.

Figure 23A:
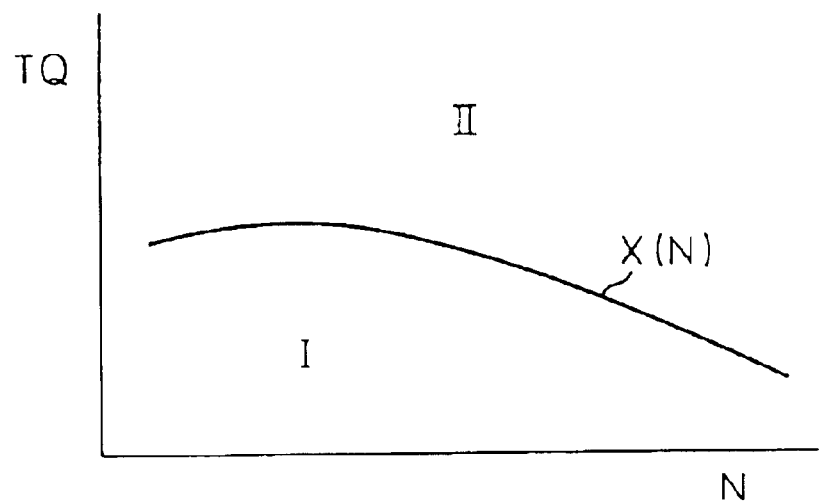
FIGS. 23A and 23B are views of engine operating regions etc.

If the required torque TQ of the engine becomes higher, however, that is, if the amount of fuel injection becomes greater, the temperature of the fuel and the surrounding gas at the time of combustion will become higher, so low temperature combustion will become difficult. That is, low temperature combustion is only possible at the time of engine middle and low load operation where the amount of heat generated by the combustion is relatively small. In FIG. 23A, region I shows the operating region where first combustion where the amount of inert gas of the combustion chamber 5 is greater than the amount of inert gas where the generation of soot peaks, that is, low temperature combustion, can be performed, while the region II shows the operating region where only second combustion where the amount of inert gas of the combustion chamber 5 is less than the amount of inert gas where the generation of soot peaks, that is, ordinary combustion, can be performed.

Figure 23B:
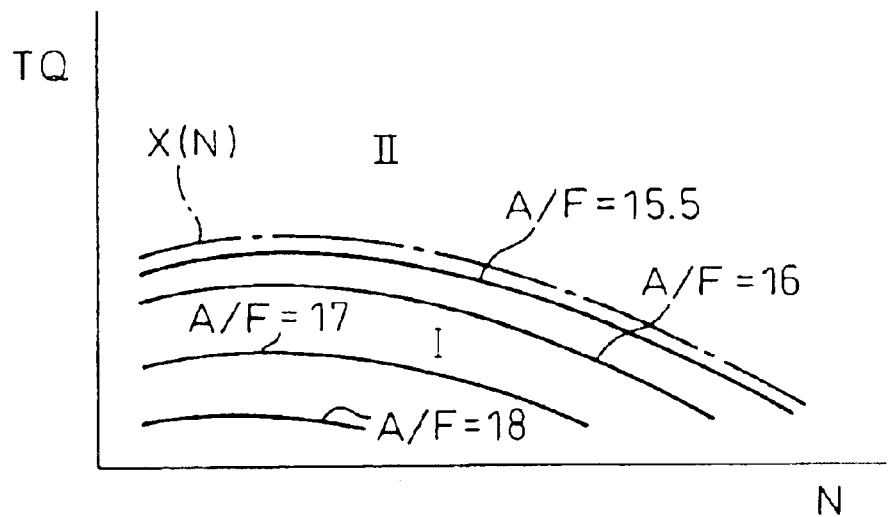

FIG. 23B shows the target air-fuel ratio A/F in the case of low temperature combustion in the operating region I. FIG. 24 shows the opening degree of the throttle valve 17, the opening degree of the EGR control valve 25, the EGR rate, the air-fuel ratio, the injection start timing θS, the injection end timing θE, and the injection amount corresponding to the required torque TQ in the case of low temperature combustion in the operating region I. Note that FIG. 24 shows together the opening degree of the throttle valve 17 etc. at the time of ordinary combustion performed in the operating region II.

Figure 24:
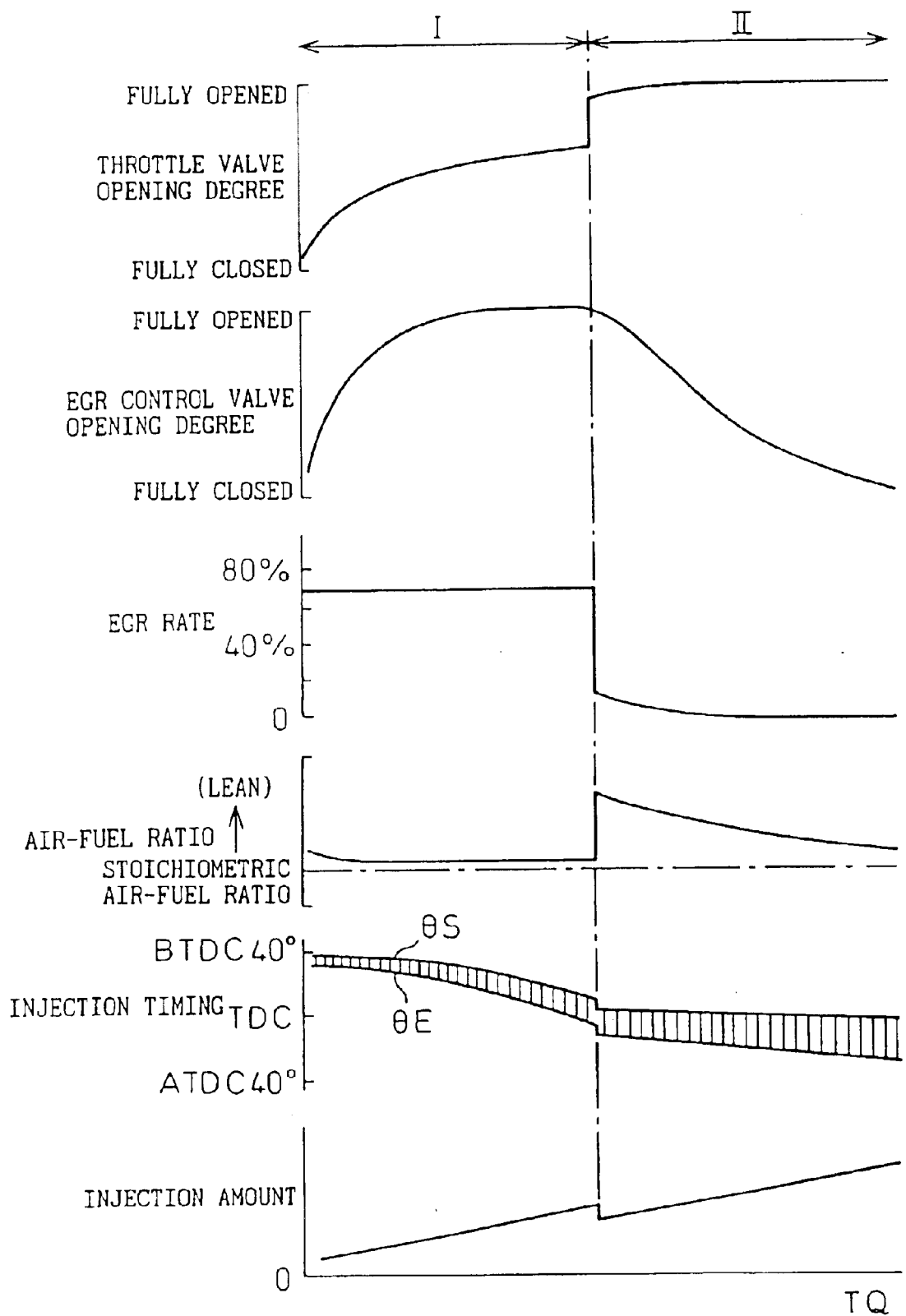
FIG. 24 is a view of changes in throttle valve opening degree etc.

From FIG. 23B and FIG. 24, it is understood that when low temperature combustion is being performed in the operating region I, the EGR rate is made at least 55 percent and the air-fuel ratio A/F is changed from 15.5 to a lean air-fuel ratio of about 18. As explained above, when low temperature combustion is being performed, almost no smoke, that is, particulate, is exhausted. Therefore, there is the advantage that it is possible to avoid buildup of a large amount of particulate on the particulate filter 22.

Further, if using low temperature combustion, the air-fuel ratio in the combustion chamber 5 can be made rich without producing a large amount of soot, that is, a large amount of particulate. Therefore, when the engine operating state is the second operating region II shown in FIG. 23A, when it is judged or predicted that the air-fuel ratio A/F should be made temporarily rich so as to increase the oxidation of the particulate, it is preferable that the air-fuel ratio A/F not be made rich until the engine operating state shifts to the first operating region I, but that the air-fuel ratio A/F be made rich after the engine operating state shifts to the first operating region I.

Figure 25:
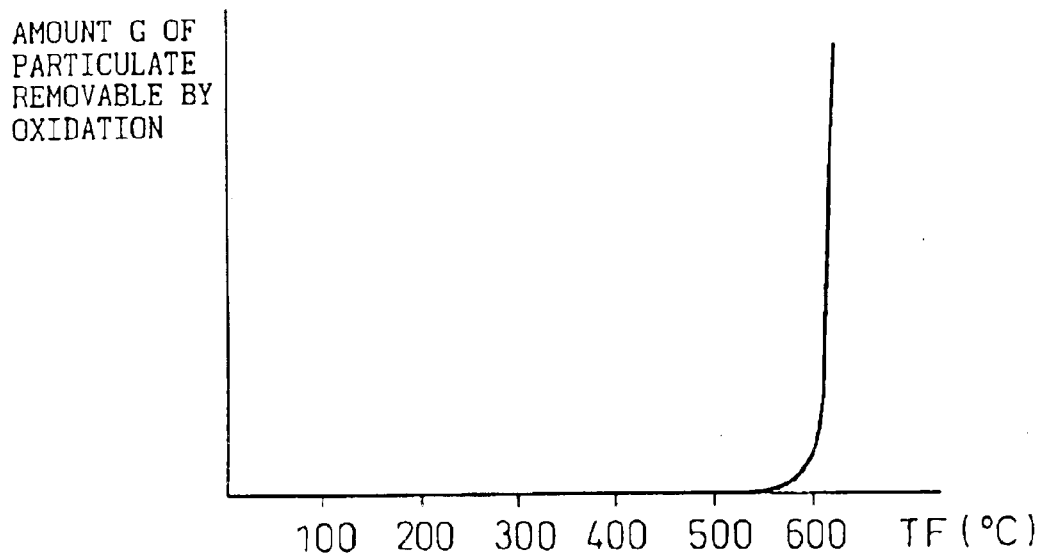
FIG. 25 is a view of the relationship between the amount of particulate removable by oxidation and the temperature of the particulate filter.

FIG. 25 to FIG. 30 show various embodiments of the case where the particulate filter 22 does not carry a catalyst. When the particulate filter 22 does not carry a catalyst, as shown in FIG. 25, the oxidation rate of the particulate, that is, the amount G of particulate removable by oxidation, rapidly rises at a temperature TF of the particulate filter 22 near 600° C. Therefore, when the temperature TF of the particulate filter 22 is less than about 600° C., the particulate deposits on the particulate filter 22 without being removed by oxidation. In a compression ignition type internal combustion engine, normally the temperature TF of the particulate filter 22 is considerably lower than 600° C. Therefore, if using a particulate filter 22 not carrying a catalyst, particulate continues to deposit on the particulate filter 22.

Therefore, when using a particulate filter 22 not carrying a catalyst, the oxidation of the deposited particulate more easily falls. Therefore, in this case as well, the air-fuel ratio A/F has to occasionally temporarily be made rich to raise the oxidation of the deposited particulate.

Figure 26:
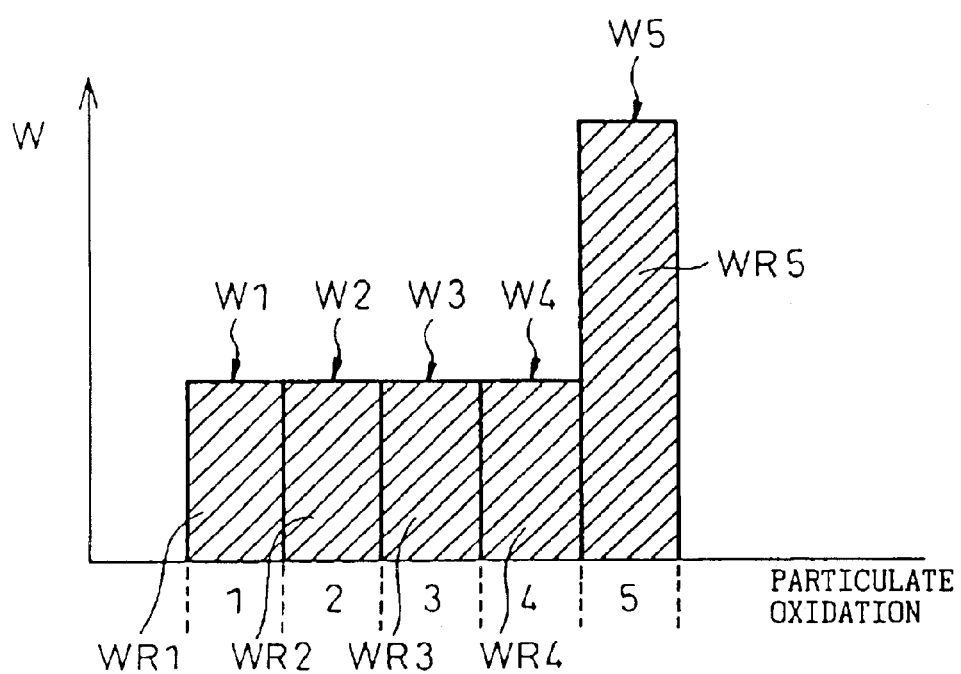
FIG. 26 is a view of the amount of deposited particulate.
Figure 27:
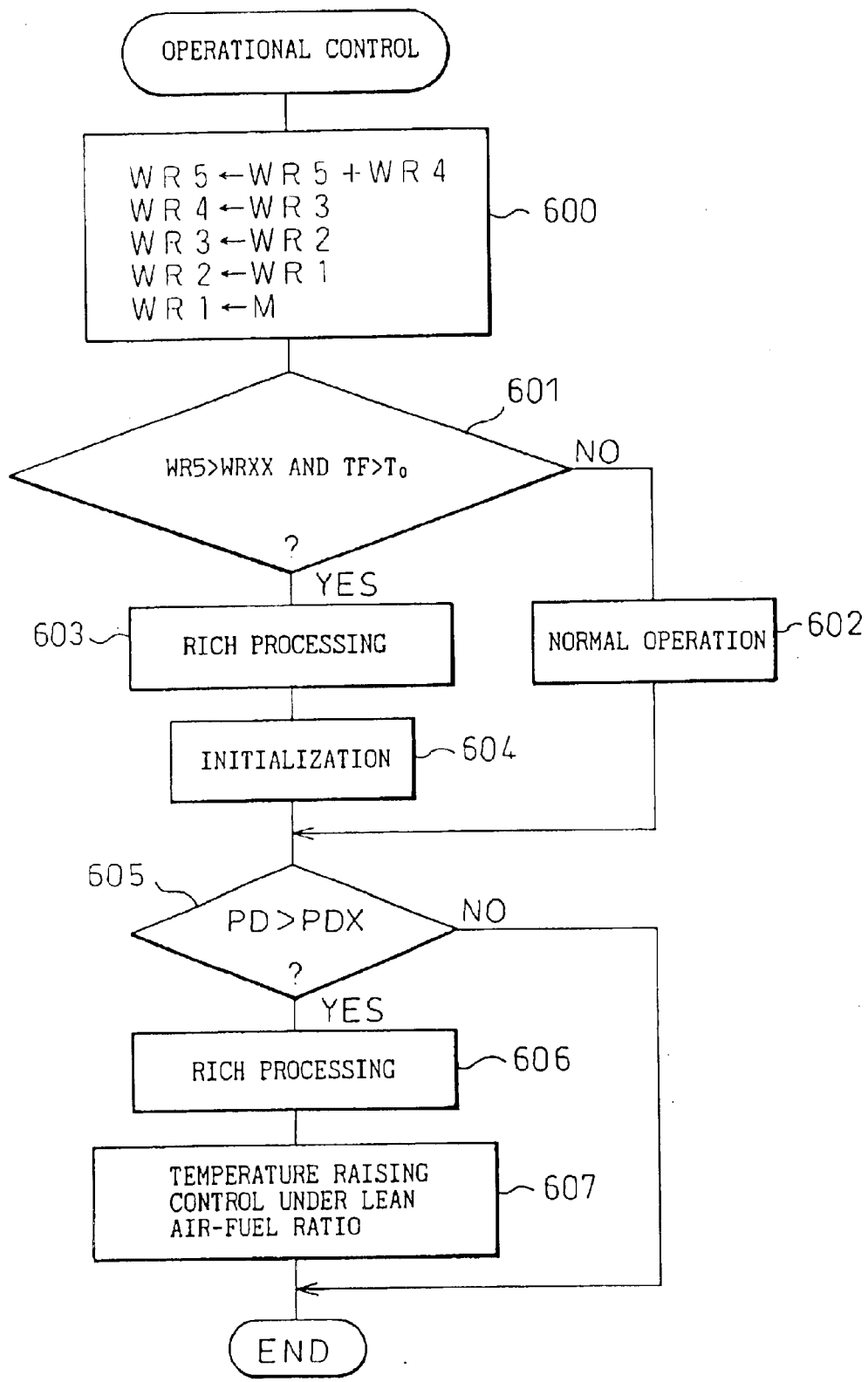
FIG. 27 is a flow chart of operational control of the engine.

FIG. 26 and FIG. 27 show a sixth embodiment suited to the case where the particulate filter 22 does not carry a catalyst. FIG. 26 shows the amount W of particulate deposited on the particulate filter 22. The numerals and symbols in FIG. 26 mean the same as those in FIG. 10. When the particulate filter 22 does not carry a catalyst, the inflowing particulate W1 all becomes the remaining particulate WR1. This remaining particulate WR1 successively changes to the poor oxidation particulates WR2, WR3, WR4, and WR5 with each passage of the unit time. Therefore, the amount WR5 of particulate with the worst oxidation gradually increases. In this embodiment, when the amount WR5 of remaining particulate exceeds an allowable limit WRXX, the air-fuel ratio A/F is temporarily made rich to increase the oxidation of the particulate.

FIG. 27 shows a flow chart for execution of the sixth embodiment.

Referring to FIG. 27, first, at step 600, the remaining amounts of particulate WR5, WR4, WR3, WR2, and WR1 are calculated based on the following relations:

WR5←WR5+WR4

WR4←WR3

WR3←WR2

WR2←WR1

WR1←M

Here, the above M is the amount of exhausted particulate calculated from the map of FIG. 14B.

Next, at step 601, it is judged if the remaining amount of particulate WR5 with the lowest oxidation has exceeded an allowable limit WRXX and if the temperature TF of the particulate filter 22 is higher than the temperature $T_0$ at which the particulate can be oxidized, for example, 250° C. When WR5≦WRXX or TF≦$T_0$, the routine proceeds to step 602, where normal operation is performed. At this time, the particulate is burned continuously under a lean air-fuel ratio. Next, the routine proceeds to step 605.

On the other hand, when it is judged at step 601 that WR5>WRXX and TF>$T_0$, the routine proceeds to step 603, where rich processing is performed to temporarily make the air-fuel ratio A/F rich. Due to this, the oxidation of the particulate is restored. Note that even if WR5>WRXX, when TF>$T_0$, the rich processing is not performed. Next, at step 604, initialization is performed. Next, the routine proceeds to step 605.

At step 605, it is judged if the amount of particulate deposited on the particulate filter 22 has exceeded a predetermined amount, that is, if the pressure drop PD at the particulate filter 22 detected by the pressure sensor 43 has exceeded the allowable limit PDX corresponding to the UL of FIG. 5. When PD>PDX, the routine proceeds to step 606, where rich processing is performed to temporarily make the air-fuel ratio A/F rich. Due to this, the oxidation of the particulate is restored. When this rich processing ends, the routine proceeds to step 607, where temperature raising control is performed to make the temperature TF of the particulate filter 22 rise to at least 600° C. and maintain it at least at 600° C. under the lean air-fuel ratio. Due to this, the particulate deposited on the particulate filter 22 can be made to burn. When the regeneration of the particulate filter 22 is completed, the temperature raising control is stopped and normal operation is performed once again.

Next, a seventh embodiment will be explained. When particulate flows into the particulate filter 22, that particulate sooner or later becomes the remaining particulate WR5 with the lowest oxidation. Therefore, it is possible to estimate the amount WR5 of remaining particulate with the lowest oxidation to a certain extent from the amount of particulate flowing into the particulate filter 22. Therefore, in this embodiment, when the cumulative amount of the amounts of particulate flowing into the particulate filter 22 exceeds a setting MX, the air-fuel ratio A/F is temporarily made rich.

Figure 28:
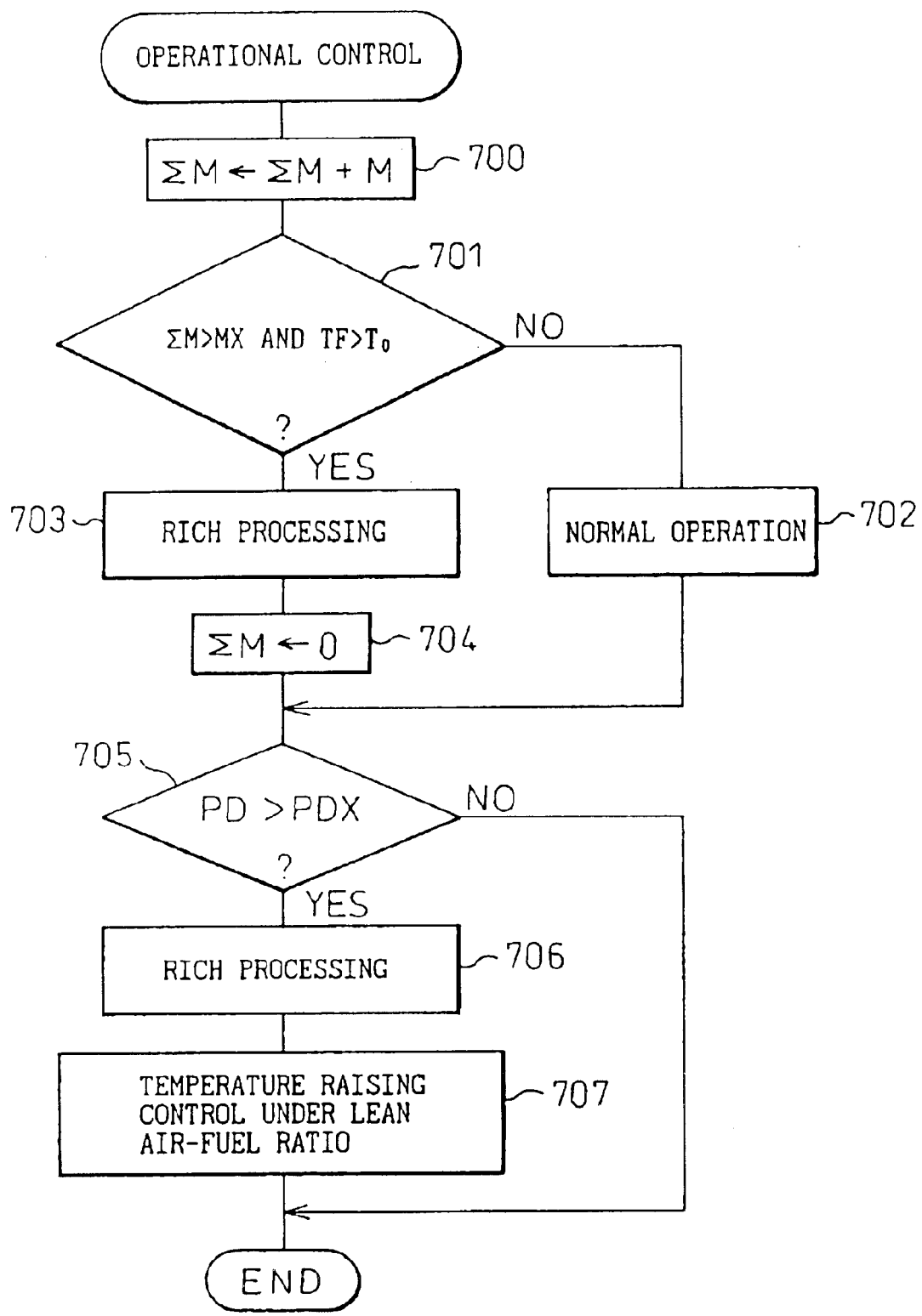
FIG. 28 is a flow chart of operational control of the engine.

FIG. 28 shows a flow chart for execution of the seventh embodiment.

Referring to FIG. 28, first, at step 700, the amount M of exhausted particulate calculated from the map shown in FIG. 14B is added to ΣM. Therefore, this ΣM expresses the cumulative value of the amounts of particulate flowing to the particulate filter 22. Next, at step 701, it is judged if the cumulative value ΣM of the amounts of particulate flowing to the particulate filter 22 has exceeded the setting MX and if the temperature TF of the particulate filter 22 is higher than the temperature $T_0$ at which the particulate can be oxidized, for example, 250° C. When ΣM≦MX or TF≦$T_0$, the routine proceeds to step 702, where normal operation is performed. At this time, the particulate is burned continuously under a lean air-fuel ratio. Next, the routine proceeds to step 705.

On the other hand, when it is judged at step 701 that ΣM>MX and TF>$T_0$, the routine proceeds to step 703, where rich processing is performed to temporarily make the air-fuel ratio A/F rich. Due to this, the oxidation of the particulate is restored. Note that even if ΣM>MX, when TF≦$T_0$, the rich processing is not performed. Next, at step 704, ΣM is cleared. Next, the routine proceeds to step 705.

At step 705, it is judged if the amount of particulate deposited on the particulate filter 22 has exceeded a predetermined amount, that is, if the pressure drop PD at the particulate filter 22 detected by the pressure sensor 43 has exceeded the allowable limit PDX corresponding to the UL of FIG. 5. When PD>PDX, the routine proceeds to step 706, where rich processing is performed to temporarily make the air-fuel ratio A/F rich. Due to this, the oxidation of the particulate is restored. When this rich processing ends, the routine proceeds to step 707, where temperature raising control is performed to make the temperature TF of the particulate filter 22 rise to at least 600° C. and maintain it at least at 600° C. under the lean air-fuel ratio. Due to this, the particulate deposited on the particulate filter 22 can be made to burn. When the regeneration of the particulate filter 22 is completed, the temperature raising control is stopped and normal operation is performed once again.

Figure 29A:
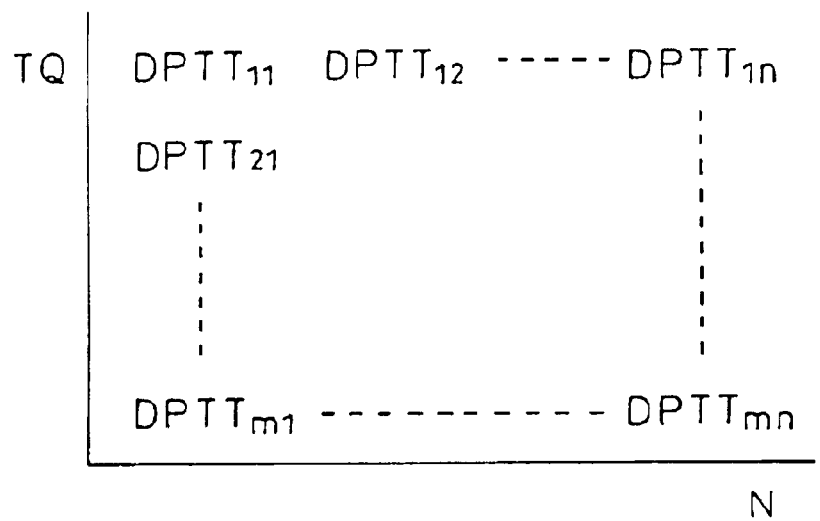
FIGS. 29A and 29B are views of maps of settings etc.
Figure 29B:
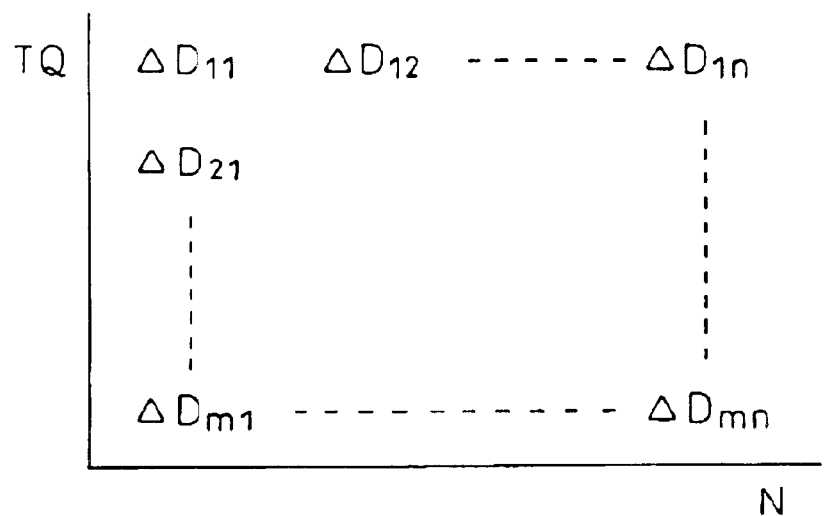
Figure 30:
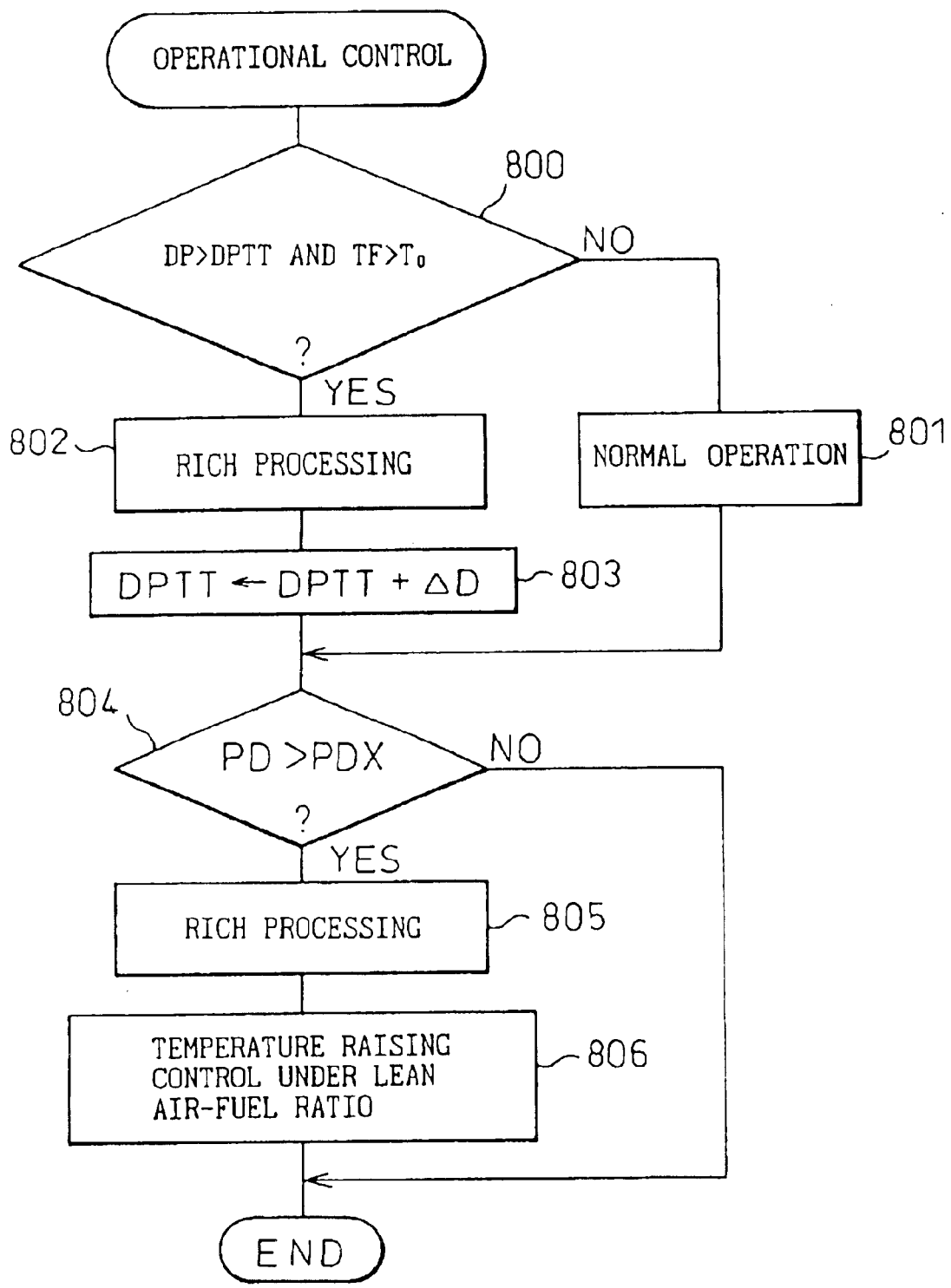
FIG. 30 is a flow chart of control of the operation of the engine.

FIG. 29 and FIG. 30 show an eighth embodiment. As explained above, when particulate flows into the particulate filter 22, the particulate sooner or later becomes the remaining particulate WR5 with the lowest oxidation. Therefore, it is possible to estimate the amount WR5 of remaining particulate with the lowest oxidation from the cumulative value of the amounts of particulate flowing into the particulate filter 22. In other words, it is possible to estimate the amount WR5 of the remaining particulate with the lowest oxidation from the increase in the pressure drop at the particulate filter 22. Therefore, in this embodiment, when the actual pressure drop PD at the particulate filter 22 exceeds a setting DPTT, the air-fuel ratio A/F is temporarily made rich. In this case, when the rich processing of the air-fuel ratio A/F ends, the air-fuel ratio A/F is temporarily made rich once again by making the setting DPTT increase by exactly ΔD.

The initial setting DPTT is stored in advance in the ROM 32 in the form of a map as a function of the required torque TQ and the engine rotational speed N as shown in FIG. 29A. The increase ΔD in the setting DPTT is also stored in advance in the ROM 32 in the form of a map as a function of the required torque TQ and the engine rotational speed N as shown in FIG. 29B.

FIG. 30 shows a flow chart for execution of the eighth embodiment.

Referring to FIG. 30, first, at step 800, it is judged if the actual pressure drop PD detected by the pressure sensor 43 is larger than the setting DPTT calculated from the map of FIG. 29A and if the temperature TF of the particulate filter 22 is higher than the temperature $T_0$ at which the particulate can be oxidized, for example, 250° C. When DP≦DPTT or TF≦$T_0$, the routine proceeds to step 801, where normal operation is performed. At this time, the particulate is burned continuously under a lean air-fuel ratio. Next, the routine proceeds to step 804.

On the other hand, when it is judged at step 800 that DP>DPTT and TF>$T_0$, the routine proceeds to step 802, where rich processing is performed to temporarily make the air-fuel ratio A/F rich. Due to this, the oxidation of the particulate is restored. Note that even if DP>DPTT, when TF≦$T_0$, the rich processing is not performed. Next, at step 803, the increase ΔD calculated from the map shown in FIG. 29B is added to the setting DPTT, and the added result is made the new setting DPTT. Next, the routine proceeds to step 804.

At step 804, it is judged if the amount of particulate deposited on the particulate filter 22 has exceeded a predetermined amount, that is, if the pressure drop PD at the particulate filter 22 detected by the pressure sensor 43 has exceeded an allowable limit PDX corresponding to UL in FIG. 5. When PD>PDX, the routine proceeds to step 805, where rich processing is performed to temporarily make the air-fuel ratio A/F rich. Due to this, the oxidation of the particulate is restored. When this rich processing ends, the routine proceeds to step 806, where temperature raising control is performed to make the temperature TF of the particulate filter 22 rise to at least 600° C. and maintain it at least at 600° C. under the lean air-fuel ratio. Due to this, the particulate deposited on the particulate filter 22 can be made to burn. When the regeneration of the particulate filter 22 is completed, the temperature raising control is stopped and normal operation is performed once again.

As explained above, according to the present invention, it is possible to make the particulate deposited on the particulate filter burn in a short time.

LIST OF REFERENCE NUMERALS

4 . . . piston
5 . . . combustion chamber
6 . . . fuel injector
7 . . . intake valve
9 . . . exhaust valve
12 . . . surge tank
14 . . . turbocharger
17 . . . throttle valve
20 . . . exhaust pipe
22 . . . particulate filter
25 . . . EGR control valve
43 . . . pressure sensor

What is claimed is:

1. An exhaust gas purification apparatus of an internal combustion engine in which a particulate filter for trapping and removing particulate in an exhaust gas is arranged in an engine exhaust passage and in which burning is continued under a lean air-fuel ratio, said apparatus comprising predicting means for predicting if the particulate deposited on the particulate filter has changed in property to a property harder to oxidize compared with right after deposition, air-fuel ratio switching means for temporarily switching the air-fuel ratio of exhaust gas flowing into the particulate filter from lean to rich to cause the particulate deposited on the particulate filter to change in property to a property of easy oxidation when it is predicted that the particulate deposited on the particulate filter has changed in property to a property harder to oxidize compared with right after deposition, judging means for judging if the amount of particulate deposited on the particulate filter has exceeded a predetermined amount, and temperature control means for causing the temperature of the particulate filter to rise under a lean air-fuel ratio so as to remove by oxidation the particulate deposited on the particulate filter when the amount of the particulate deposited on the particulate filter has exceeded a predetermined amount.

2. An exhaust gas purification apparatus as set forth in claim 1, wherein said air-fuel ratio switching means will not switch the air-fuel ratio from lean to rich when the temperature of the particulate filter is lower than a predetermined temperature even when it is predicted that the particulate deposited on the particulate filter has changed in property to a property harder to oxidize compared with right after deposition.

3. An exhaust gas purification apparatus as set forth in claim 1, wherein said predicting means predicts that the particulate deposited on the particulate filter has changed in property to a property harder to oxidize compared with right after deposition at the time of engine startup or when high speed operation has continued for at least a predetermined time.

4. An exhaust gas purification apparatus as set forth in claim 1, wherein said predicting means predicts that the particulate deposited on the particulate filter has changed in property to a property harder to oxidize compared with right after deposition when an operating time of the engine, a cumulative value of engine revolutions, or a vehicle running distance has exceeded a predetermined value.

5. An exhaust gas purification apparatus as set forth in claim 1, wherein a catalyst is carried on the particulate filter.

6. An exhaust gas purification apparatus of an internal combustion engine in which a particulate filter for trapping and removing particulate in an exhaust gas is arranged in an engine exhaust passage and in which burning is continued under a lean air-fuel ratio, said apparatus comprising first judging means for judging if the particulate deposited on the particulate filter has changed in property to a property harder to oxidize compared with right after deposition, air-fuel ratio switching means for temporarily switching the air-fuel ratio of exhaust gas flowing into the particulate filter from lean to rich to cause the particulate deposited on the particulate filter to change in property to a property of easy oxidation when it is judged that the particulate deposited on the particulate filter has changed in property to a property harder to oxidize compared with right after deposition, second judging means for judging if the amount of particulate deposited on the particulate filter has exceeded a predetermined amount, and temperature control means for causing the temperature of the particulate filter to rise under a lean air-fuel ratio so as to remove by oxidation the particulate deposited on the particulate filter when the amount of the particulate deposited on the particulate filter has exceeded a predetermined amount.

7. An exhaust gas purification apparatus as set forth in claim 6, wherein said air-fuel ratio switching means will not switch the air-fuel ratio from lean to rich when the temperature of the particulate filter is lower than a predetermined temperature even when it is judged that the particulate deposited on the particulate filter has changed in property to a property harder to oxidize compared with right after deposition.

8. An exhaust gas purification apparatus as set forth in claim 6, wherein said apparatus is further provided with calculating means for calculating a drop and increase of oxidation per unit time of the particulate deposited on the particulate filter and wherein said first judging means judges if the particulate deposited on the particulate filter has changed in property to a property harder to oxidize compared with right after deposition based on said drop and increase of the oxidation.

9. An exhaust gas purification apparatus as set forth in claim 6, wherein said apparatus is further provided with calculating means for calculating an amount of particulate with the greatest drop in oxidation in the particulate deposited on the particulate filter by using a model and wherein said first judging means judges if the particulate deposited on the particulate filter has changed in property to a property harder to oxidize compared with right after deposition when the amount of particulate with the greatest drop in oxidation exceeds a predetermined amount.

10. An exhaust gas purification apparatus as set forth in claim 6, wherein a catalyst is carried on the particulate filter.

11. An exhaust gas purification apparatus as set forth in claim 6, wherein said apparatus is further provided with estimating means for estimating a pressure drop in the particulate filter and detecting means for detecting an actual pressure drop in the particulate filter and wherein said first judging means judges if the particulate deposited on the particulate filter has changed in property to a property harder to oxidize compared with right after deposition from the pressure difference between the pressure drop estimated by said estimating means and the actual pressure drop detected by said detecting means.

12. An exhaust gas purification apparatus as set forth in claim 11, wherein said estimating means calculates the amount of particulate deposited on the particulate filter from the amount of particulate flowing into the particulate filter and the temperature of the particulate filter and estimates the pressure drop in the particulate filter from the amount of deposited particulate.

13. An exhaust gas purification apparatus as set forth in claim 11, wherein said apparatus is further provided with temperature raising means for causing the temperature of the particulate filter to temporarily rise so as to partially remove by oxidation the particulate on the particulate filter and wherein said first judging means judges if the particulate deposited on the particulate filter has changed in property to a property harder to oxidize compared with right after deposition from said pressure difference after the completion of the temperature raising action by said temperature raising means.

14. An exhaust gas purification apparatus as set forth in claim 13, wherein said first judging means causes the temperature of the particulate filter to temporarily rise by said temperature raising means when the actual pressure drop detected by said detecting means reaches a target value stored in advance and judges if the particulate deposited on the particulate filter has changed in property to a property harder to oxidize compared with right after deposition from the pressure difference between the pressure drop after the completion of the temperature raising action stored in advance and the actual pressure drop detected by said detecting means.

15. An exhaust gas purification apparatus of an internal combustion engine in which a particulate filter for trapping and removing particulate in an exhaust gas is arranged in an engine exhaust passage and in which burning is continued under a lean air-fuel ratio, said apparatus comprising air-fuel ratio switching means able to temporarily switch the air-fuel ratio of exhaust gas flowing into the particulate filter from lean to rich, judging means for judging if the amount of particulate deposited on the particulate filter has exceeded a predetermined amount, and temperature control means for causing the temperature of the particulate filter to rise under a lean air-fuel ratio so as to remove by oxidation the particulate deposited on the particulate filter after temporarily switching the air-fuel ratio of the exhaust gas flowing into the particulate filter from lean to rich to make the particulate deposited on the particulate filter change in property to a property of easy oxidation when the amount of the particulate deposited on the particulate filter has exceeded a predetermined amount.

16. An exhaust gas purification apparatus as set forth in claim 15, wherein a catalyst is carried on the particulate filter.

* * * * *